(12) United States Patent
Ding et al.

(10) Patent No.: US 12,546,974 B2
(45) Date of Patent: Feb. 10, 2026

(54) OPTICAL IMAGING LENS ASSEMBLY WITH SPACING ELEMENT DESIGN

(71) Applicant: Zhejiang Sunny Optics Co., Ltd, Yuyao (CN)

(72) Inventors: Ren Ding, Yuyao (CN); Zailin Ke, Yuyao (CN); Zeguang Wang, Yuyao (CN); Hui Li, Yuyao (CN); Chongjian Huang, Yuyao (CN); Jiadong Zhu, Yuyao (CN); Xiancui Ding, Yuyao (CN); Fujian Dai, Yuyao (CN); Liefeng Zhao, Yuyao (CN)

(73) Assignee: Zhejiang Sunny Optics Co., Ltd, Yuyao (CN)

( * ) Notice: Subject to any disclaimer, the term of this patent is extended or adjusted under 35 U.S.C. 154(b) by 282 days.

(21) Appl. No.: 18/302,438

(22) Filed: Apr. 18, 2023

(65) Prior Publication Data
US 2023/0393374 A1 Dec. 7, 2023

(30) Foreign Application Priority Data
Jun. 7, 2022 (CN) .......................... 202210638659.4

(51) Int. Cl.
| | | |
|---|---|---|
| *G02B 13/00* | (2006.01) | |
| *G02B 7/02* | (2021.01) | |
| *G02B 9/64* | (2006.01) | |
| *G02B 13/04* | (2006.01) | |

(52) U.S. Cl.
CPC ........... *G02B 9/64* (2013.01); *G02B 13/0045* (2013.01); *G02B 13/04* (2013.01)

(58) Field of Classification Search
CPC ...... G02B 9/64; G02B 13/0045; G02B 13/04; G02B 9/62
See application file for complete search history.

(56) References Cited

U.S. PATENT DOCUMENTS

| | | | | |
|---|---|---|---|---|
| 10,859,796 B2* | 12/2020 | Li | ............................ | G02B 7/04 |
| 10,921,561 B2* | 2/2021 | Lyu | ........................... | G02B 9/64 |
| 2024/0019664 A1* | 1/2024 | Zhu | ........................... | G02B 9/64 |

FOREIGN PATENT DOCUMENTS

| | | |
|---|---|---|
| CN | 106526801 A | 3/2017 |
| CN | 108508581 A | 9/2018 |
| CN | 110187479 A | 8/2019 |
| CN | 212623279 U | 2/2021 |

(Continued)

OTHER PUBLICATIONS

Office Action issued Aug. 5, 2025 in Chinese Patent Application No. 202210638659.4.

(Continued)

*Primary Examiner* — Joseph L Williams
(74) *Attorney, Agent, or Firm* — Sughrue Mion, PLLC

(57) ABSTRACT

An optical imaging lens assembly is provided, including: an imaging lens group, a plurality of spacing elements, and a lens barrel configured to accommodate the imaging lens group and the plurality of spacing elements including a third spacing element that is placed between the third lens and the fourth lens and is in contact with an image-side surface of the third lens. Here, an inner diameter d3s of an object-side surface of the third spacing element, a radius of curvature R5 of an object-side surface of the third lens and a radius of curvature R6 of the image-side surface of the third lens satisfy: 5.0<d3s/(R5+R6)<10.5.

16 Claims, 8 Drawing Sheets

(56) References Cited

FOREIGN PATENT DOCUMENTS

| | | |
|---|---|---|
| CN | 113296247 A | 8/2021 |
| CN | 113296248 A | 8/2021 |
| CN | 113376808 A | 9/2021 |
| CN | 217846762 U | 11/2022 |

OTHER PUBLICATIONS

Communication issued Nov. 28, 2025 in Chinese Application No. 202210638659.4.

* cited by examiner

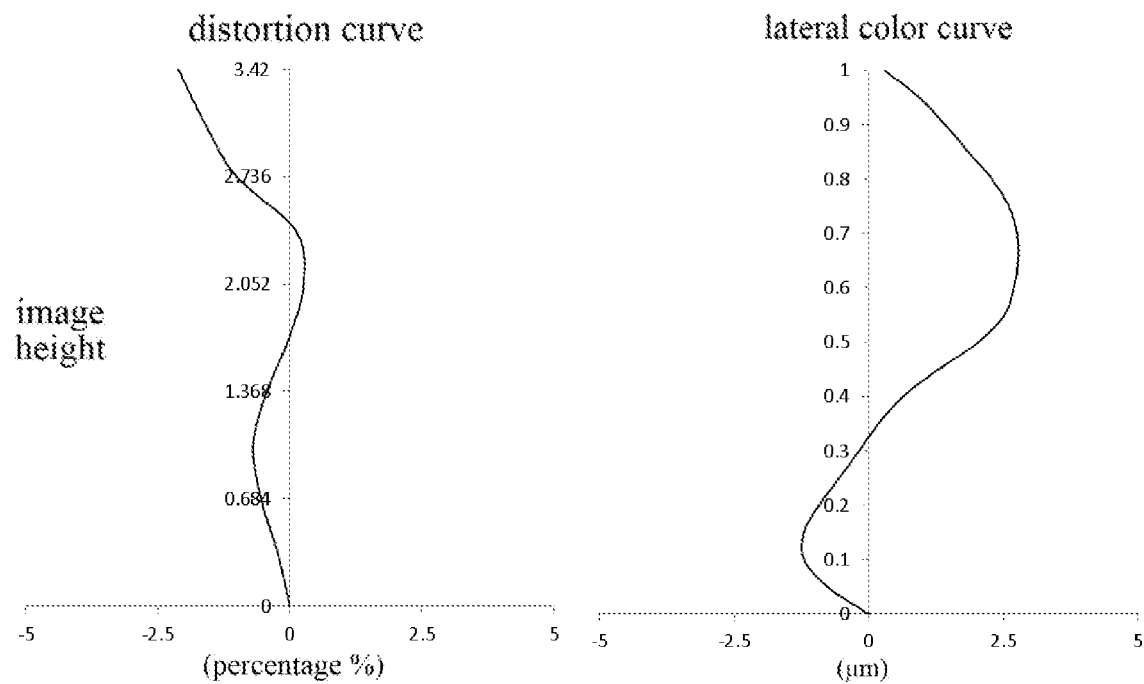
Fig. 3C
Fig. 3D
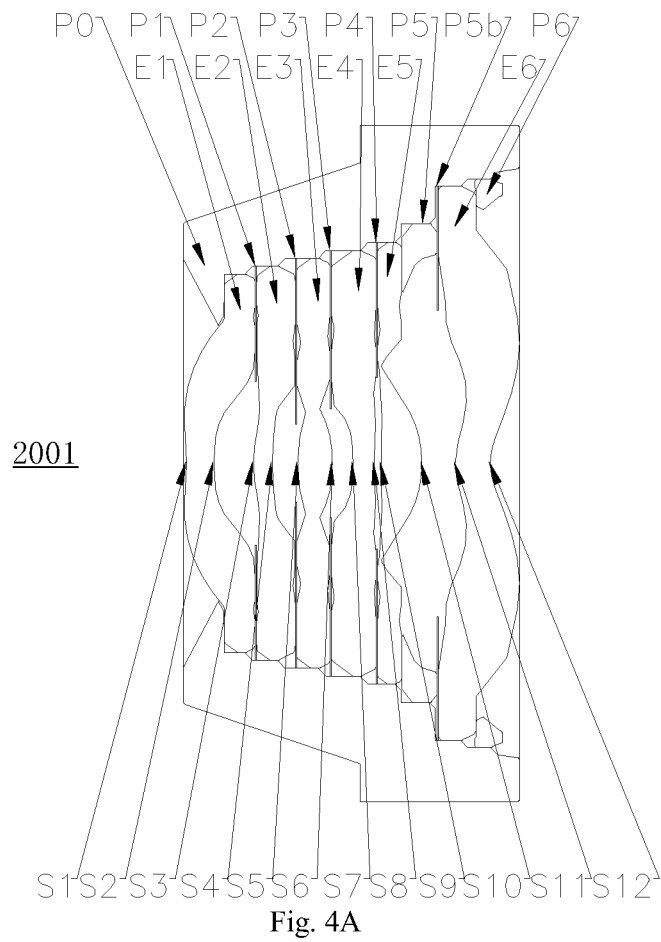
Fig. 4A

OPTICAL IMAGING LENS ASSEMBLY WITH SPACING ELEMENT DESIGN

CROSS-REFERENCE TO RELATED APPLICATIONS

This application claims benefit of priority to Chinese Patent Application No. 202210638659.4 filed on Jun. 7, 2022 before the China National Intellectual Property Administration, the entire disclosure of which is incorporated herein by reference in its entity.

TECHNICAL FIELD

The present disclosure relates to the field of optical elements, and specifically to an optical imaging lens assembly.

BACKGROUND

In recent years, due to a large field-of-view and a long depth of field, wide-angle cameras can accommodate a wider picture background when taking a selfie, and at the same time can ensure a clear imaging effect, such that a proportion of the person image in an entire picture is more reasonable, leading to a more beautiful picture. Therefore, wide-angle camera lens assemblies are widely used in mobile phones. However, wide-angle lens assemblies generally have disadvantages of a large size and a poor structural stability.

As is known to all, a lens in an optical imaging lens assembly includes an imaging part and a structure part. When light is incident on the structure part, and reflected and refracted by the lens to be incident on an image plane, it is easy to generate stray light. Moreover, the field-of-view of a wide-angle lens assembly is larger, and thus, the structure part thereof is more likely to produce stray light.

Therefore, how to make the optical imaging lens assembly has a reduced axial length of a lens group while ensuring a large wide-angle and a long depth of field to make the lens assembly more advantageous in thinness and lightness, and how to improve a structure of a spacing element (e.g., a ring optical element and an anti-dazzling screen) in the lens assembly to achieve improvements in the stray light and assembling stability have become one of the most important issues today.

SUMMARY

An optical imaging lens assembly is provided in the present disclosure, the optical imaging lens assembly including: an imaging lens group, comprising, sequentially along an optical axis from an object side to an image side: a first lens having a negative refractive power, a second lens having a positive refractive power, a third lens having a positive refractive power, a fourth lens having a negative refractive power, a fifth lens having a positive refractive power and a sixth lens having a positive refractive power, a plurality of spacing elements, comprising: a first spacing element that is placed between the first lens and the second lens and is in contact with an image-side surface of the first lens, a second spacing element that is placed between the second lens and the third lens and is in contact with an image-side surface of the second lens, a fifth spacing element that is placed between the fifth lens and the sixth lens and is in contact with an image-side surface of the fifth lens, and a sixth spacing element that is placed on an image side of the sixth lens and is in contact with an image-side surface of the sixth lens; and a lens barrel, configured to accommodate the imaging lens group and the plurality of spacing elements, where an outer diameter D1$s$ of an object-side surface of the first spacing element, half of a maximal field-of-view Semi-FOV of the optical imaging lens assembly, a sum $\Sigma$AT of air spacings between any two adjacent lenses in the first lens to the sixth lens on the optical axis and a maximal height L of the lens barrel along a direction of the optical axis satisfy: $-4.0 < D1s \times \tan(\text{Semi-FOV})/(\Sigma AT - L) < -2.0$, and the outer diameter D1$s$ of the object-side surface of the first spacing element, an inner diameter d2$s$ of an object-side surface of the second spacing element, an effective focal length f2 of the second lens, an outer diameter D5$m$ of an image-side surface of the fifth spacing element and a spacing EP56 between the fifth spacing element and the sixth spacing element along the direction of the optical axis satisfy: $16.0 < (D1s - d2s) \times f2 - (D5m \times EP56) < 33.0$.

In an implementation, the plurality of spacing elements further comprise: a third spacing element that is placed between the third lens and the fourth lens and is in contact with an image-side surface of the third lens, where an inner diameter d3$s$ of an object-side surface of the third spacing element, a radius of curvature R5 of an object-side surface of the third lens and a radius of curvature R6 of the image-side surface of the third lens satisfy: $5.0 < d3s/(R5 + R6) < 10.5$.

In an implementation, the plurality of spacing elements further comprise: a fourth spacing element that is placed between the fourth lens and the fifth lens and is in contact with an image-side surface of the fourth lens, an effective focal length f4 of the fourth lens, a center thickness CT5 of the fifth lens on the optical axis, an air spacing T45 between the fourth lens and the fifth lens on the optical axis, a maximal thickness CP4 of the fourth spacing element along the direction of the optical axis and a spacing EP45 between the fourth spacing element and the fifth spacing element along the direction of the optical axis satisfy: $-17.5 < (CT5 + T45) \times EP45/(CP4 \times f4) < -5.0$.

In an implementation, a radius of curvature R7 of an object-side surface of the fourth lens, a radius of curvature R8 of the image-side surface of the fourth lens, the outer diameter D5$m$ of the image-side surface of the fifth spacing element and an inner diameter d5$m$ of the image-side surface of the fifth spacing element satisfy: $-7.5 < (R7 + R8)/(D5m - d5m) < -1.0$.

In an implementation, an inner diameter d5$s$ of an object-side surface of the fifth spacing element, an inner diameter d6$s$ of an object-side surface of the sixth spacing element, a center thickness CT6 of the sixth lens on the optical axis and an air spacing T56 between the fifth lens and the sixth lens on the optical axis satisfy: $10.0 < (d5s + d6s)/(CT6 + T56) < 13.5$.

In an implementation, the plurality of spacing elements further comprise: a fourth spacing element that is placed between the fourth lens and the fifth lens and is in contact with an image-side surface of the fourth lens, where an inner diameter d4$s$ of an object-side surface of the fourth spacing element, a spacing EP45 between the fourth spacing element and the fifth spacing element along the direction of the optical axis and a center thickness CT4 of the fourth lens on the optical axis satisfy: $4.0 < (d4s - EP45)/CT4 < 9.0$.

In an implementation, the plurality of spacing elements further comprise: a third spacing element that is placed between the third lens and the fourth lens and is in contact with an image-side surface of the third lens, and a fourth spacing element that is placed between the fourth lens and the fifth lens and is in contact with an image-side surface of the fourth lens, where a center thickness CT3 of the third lens on the optical axis, a center thickness CT4 of the fourth lens on the optical axis, a maximal thickness CP3 of the third spacing element along the direction of the optical axis and a maximal thickness CP4 of the fourth spacing element along the direction of the optical axis satisfy: 11.0<CT3/CP3−CT4/CP4<17.5.

In an implementation, an effective focal length f1 of the first lens, an effective focal length f5 of the fifth lens, an effective focal length f6 of the sixth lens, a maximal thickness CP1 of the first spacing element along the direction of the optical axis, a maximal thickness CP5 of the fifth spacing element along the direction of the optical axis and a maximal thickness CP6 of the sixth spacing element along the direction of the optical axis satisfy: |f6×CP1/(CP5×f5+f1×CP6)|<37.0.

In an implementation, the maximal thickness CP1 of the first spacing element along the direction of the optical axis, a radius of curvature R1 of an object-side surface of the first lens and a radius of curvature R2 of an image-side surface of the first lens satisfy: 110.0<(R1+R2)/CP1<135.0.

In an implementation, the plurality of spacing elements further comprise: the fourth spacing element that is placed between the fourth lens and the fifth lens and is in contact with the image-side surface of the fourth lens, where the effective focal length f6 of the sixth lens, a radius of curvature R7 of an object-side surface of the fourth lens, a radius of curvature R11 of an object-side surface of the sixth lens and a maximal thickness CP4 of the fourth spacing element along the direction of the optical axis satisfy: −230.0<f6/R11+R7/CP4<311.0.

In an implementation, the plurality of spacing elements further comprise at least one auxiliary spacing element placed between any two adjacent lenses, an object-side surface of the auxiliary spacing element is in contact with a spacing element located on an object side of the auxiliary spacing element or with an other auxiliary spacing element, and an image-side surface of the auxiliary spacing element is in contact with a lens located on an image side of the auxiliary spacing element or with an other auxiliary spacing element.

The optical imaging lens assembly provided by the present disclosure is composed of the imaging lens group, the plurality of spacing elements and the lens barrel. By adjusting the air spacings between the lenses of the imaging lens group and the relationship between the field-of-view and the maximal height of the lens barrel, the lens assembly has a small axial height under the premise of ensuring the imaging capability, which makes the lens assembly has the characteristics of miniaturization and a light weight. According to the optical imaging lens assembly provided by the present disclosure, by reasonably controlling the effective focal length of the second lens, it is conducive to improving the field-of-view of the lens assembly. At the same time, by setting the values of the outer diameter of the object-side surface of the first spacer and the inner diameter of the object-side surface of the second spacer, the stray light by internal reflection of the optical structure of the first lens can be effectively absorbed, such that the images of the lens assembly are clear with no abnormalities. By reasonably setting the spacing between the fifth spacing element and the sixth spacing element, it is conducive to reducing the sensitivity of EP56 and to obtain a linear proportional change between the air spacing and the field curvature, and thus the yield of the MTF performance curve can be adjusted more effectively in the actual production process.

BRIEF DESCRIPTION OF THE DRAWINGS

After reading detailed descriptions of non-limiting embodiments given with reference to the following accompanying drawings, other features, objectives and advantages of the present disclosure will become more apparent:

FIGS. 3A-3D respectively illustrate a longitudinal aberration curve, an astigmatic curve, a distortion curve and a lateral color curve of the optical imaging lens assembly according to Embodiment 1 of the present disclosure;

FIGS. 4A and 4B are schematic structural diagrams of an optical imaging lens assembly according to Embodiment 2 of the present disclosure;

DETAILED DESCRIPTION OF EMBODIMENTS

Figure 1A:
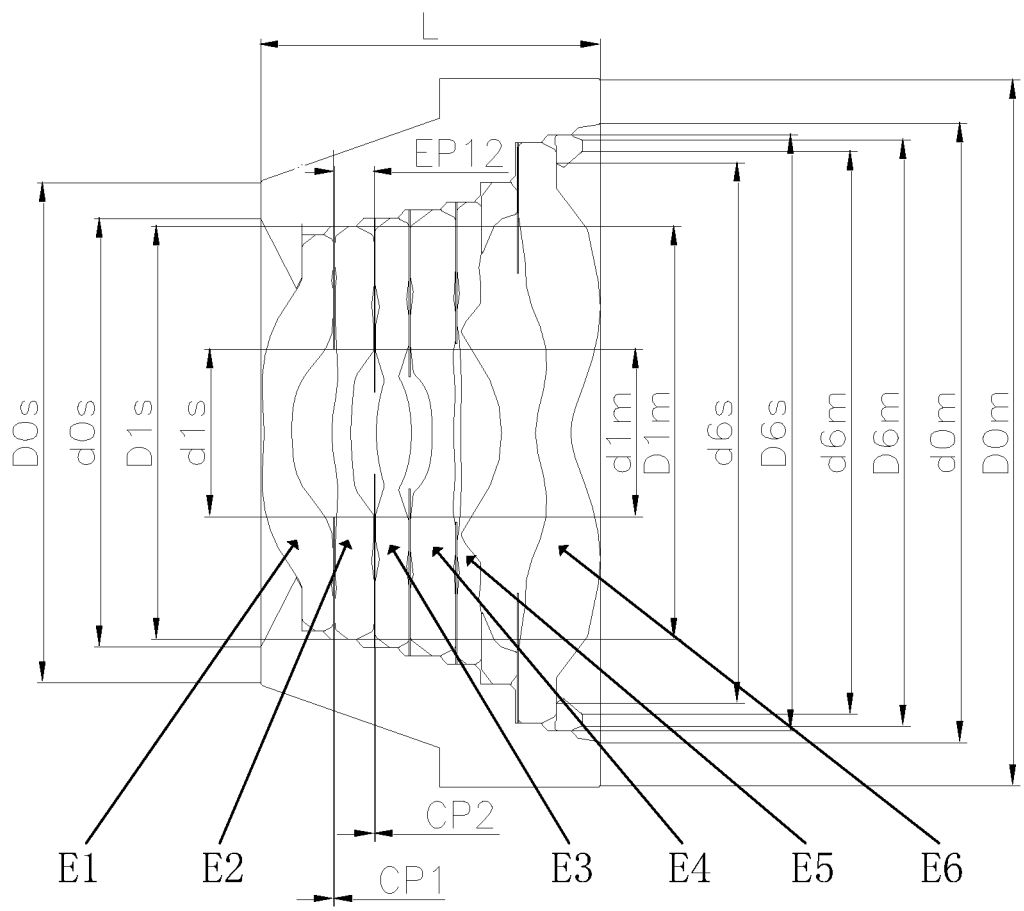
FIG. 1A is a structural layout diagram of an optical imaging lens assembly according to the present disclosure and a schematic diagram of some parameters.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, the shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. A surface of each lens that is closest to a photographed object is referred to as the object-side surface of the lens, and a surface of the each lens that is closest to an image plane is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, represents "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The following embodiments only express several implementations of the present disclosure, and the description thereof is specific and detailed, but should not be construed as a limitation to the patent scope of the present disclosure. It should be noted that those skilled in the art can make several variations and improvements without departing from the concept of the present disclosure, and these variations and improvements all fall into the scope of protection of the present disclosure. For example, the lens groups (i.e., the first lens to the sixth lens), the lens barrel structures and the spacing elements in the embodiments of the present disclosure can be combined arbitrarily, and it is not limited that the lens group in one embodiment can only be combined with the lens barrel structure, the spacing element, etc. in this embodiment.

The present disclosure will be described below in detail with reference to the accompanying drawings and in combination with the embodiments. Here, FIG. 1A is a schematic diagram of a structural layout and some parameters of an optical imaging lens assembly according to the present disclosure. It should be understood by those skilled in the art that some parameters (e.g., the radius of curvature R5 of the object-side surface of the third lens) frequently used in the art are not shown in FIG. 1A, and FIG. 1A only shows some parameters of a lens barrel and spacing elements of an optical imaging lens assembly according to the present disclosure by examples, for a better understanding of the present disclosure. As shown in FIG. 1A, EP12 represents a spacing between a first spacing element and a second spacing element along a direction of an optical axis; D0s represents an outer diameter of an object-end surface of the lens barrel; d0s represents an inner diameter of the object-end surface of the lens barrel; D1s represents an outer diameter of an object-side surface of the first spacing element; d1s represents an inner diameter of the object-side surface of the first spacing element; CP1 represents a maximal thickness of the first spacing element along the direction of the optical axis; CP2 represents a maximal thickness of the second spacing element along the direction of the optical axis; D1m represents an outer diameter of an image-side surface of the first spacing element; d1m represents an inner diameter of the image-side surface of the first spacing element; D6s represents an outer diameter of an object-side surface of a sixth spacing element; d6s represents an inner diameter of the object-side surface of the sixth spacing element; d6m represents an inner diameter of an image-side surface of the sixth spacing element; D6m represents an outer diameter of the image-side surface of the sixth spacing element; d0m represents an inner diameter of an image-end surface of the lens barrel; D0m represents an outer diameter of the image-end surface of the lens barrel; and L is a maximal height of the lens barrel along the direction of the optical axis.

Features, principles and other aspects of the present disclosure are described below in detail.

As shown in FIG. 1A, the optical imaging lens assembly according to exemplary implementations of the present disclosure includes an imaging lens group and a plurality of spacing elements. Here, the imaging lens group includes, sequentially along an optical axis from an object side to an image side: a first lens E1 having a negative refractive power, a second lens E2 having a positive refractive power, a third lens E3 having a positive refractive power, a fourth lens E4 having a negative refractive power, a fifth lens having a positive refractive power E5 and a sixth lens E6 having a positive refractive power. There may be a spacing distance between any two adjacent lenses in the lenses from the first lens E1 to the sixth lens E6. By reasonably assigning a positive or a negative refractive power of each lens of the optical imaging lens assembly, a low-order aberration of the optical imaging lens assembly can be effectively balanced and controlled, a tolerance sensitivity can be reduced, and the miniaturization of the optical imaging lens assembly can be maintained.

Figure 1B:
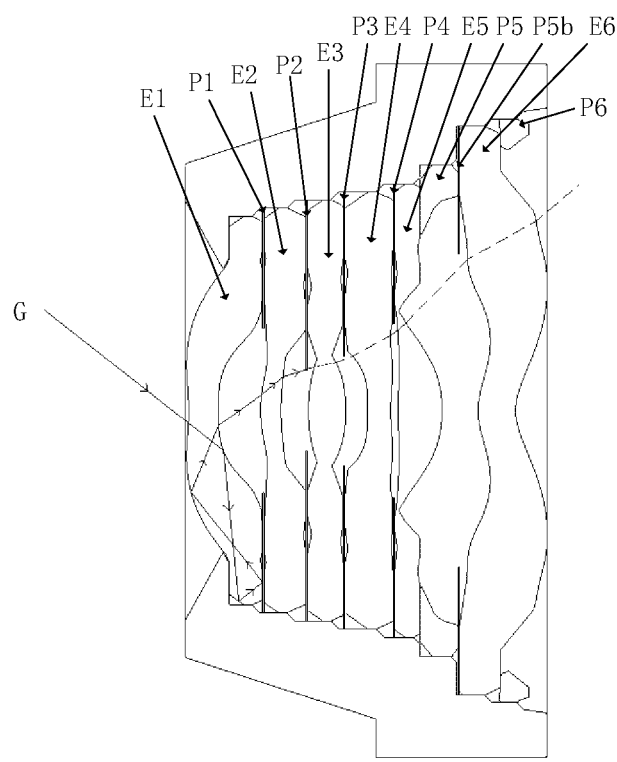
FIG. 1B is a schematic diagram of reducing stray light by spacing elements of an optical imaging lens assembly according to the present disclosure.

In the exemplary implementations, as shown in FIG. 1B, the plurality of spacing elements include: a first spacing element P1 that is placed between the first lens E1 and the second lens E2 and is in contact with an image-side surface of the first lens E1, a second spacing element P2 that is placed between the second lens E2 and the third lens E3 and is in contact with an image-side surface of the second lens E2, a third spacing element P3 that is placed between the third lens E3 and the fourth lens E4 and is in contact with an image-side surface of the third lens E3, a fourth spacing element P4 that is placed between the fourth lens E4 and the fifth lens E5 and is in contact with an image-side surface of the fourth lens E4, a fifth spacing element P5 that is placed between the fifth lens E5 and the sixth lens E6 and is in contact with an image-side surface of the fifth lens E5, and a sixth spacing element P6 that is placed on an image side of the sixth lens E6 and is in contact with an image-side surface of the sixth lens E6.

In the exemplary implementations, the plurality of spacing elements further include at least one auxiliary spacing element placed between any two adjacent lenses. An object-side surface of the auxiliary spacing element is in contact with a spacing element located on an object side of the auxiliary spacing element or with an other auxiliary spacing element. An image-side surface of the auxiliary spacing element is in contact with a lens located on an image side of the auxiliary spacing element or with an other auxiliary spacing element. As shown in FIG. 1B, P5b is an auxiliary spacing element, the object-side surface of which is in contact with a fifth spacing element p5 located on the object side of the auxiliary spacing element, and the image-side surface of which is in contact with the sixth lens E6 located on the image side of the auxiliary spacing element In the exemplary implementations, the optical imaging lens assembly includes at least six spacing elements. The spacing elements facilitate the optical imaging lens assembly to intercept unwanted refraction and reflection optical paths, thereby reducing stray light and ghost images.

FIG. 1B is a schematic diagram of reducing stray light by spacing elements of an optical imaging lens according to the present disclosure. A beam of light G is reflected to a structure part of the first lens E1 after entering the first lens E1, then reflected to the second spacing element P2 by the structure part of the first lens E1, and does not enter rear lens. Dashed line represents a path of the light G entering the rear lens without being blocked by the second spacing element P2. It should be understood that, in order to make the structure and annotation in the accompanying drawing clearer, in FIG. 1B, only the second spacing element P2 is used as an example to eliminate stray light, the remaining spacing elements also have the function of eliminating stray light, and the principles are the same. Therefore, the optical imaging lens assembly of the present disclosure can play the role of blocking a non-imaging optical path, reducing stray light and ensuring the imaging effect of the lens assembly through the plurality of spacing elements provided therein.

In the exemplary implementations, as shown in FIGS. 1A and 1B, the optical imaging lens assembly further includes a lens barrel configured to accommodate the imaging lens group and the plurality of spacing elements.

In the exemplary implementations, the optical imaging lens assembly according to the present disclosure may satisfy: $|f6 \times CP1/(CP5 \times f5 + f1 \times CP6)| < 37.0$. Here, f1 is an effective focal length of the first lens, f5 is an effective focal length of the fifth lens, f6 is an effective focal length of the sixth lens, CP1 is a maximal thickness of the first spacing element along a direction of the optical axis, CP5 is a maximal thickness of the fifth spacing element along the direction of the optical axis, and CP6 is a maximal thickness of the sixth spacing element along the direction of the optical axis. For CP1, reference may be made to FIG. 1A. More specifically, f1, f5, f6, CP1, CP5 and CP6 may further satisfy: $|f6 \times CP1/(CP5 \times f5 + f1 \times CP6)| < 36.27$. When $|f6 \times CP1/(CP5 \times f5 + f1 \times CP6)| < 37.0$ is satisfied, by controlling the effective focal lengths of the first lens, the fifth lens and the sixth lens, a more ideal field-of-view can be obtained, and thus, the imaging quality will not be reduced while the relative illumination and pixels are improved. The effective focal lengths of the first lens, the fifth lens and the sixth lens and the maximal thicknesses of the first spacing element, the fifth spacing element and the sixth spacing element are comprehensively considered and optimized. Thus, the reduced axial length of the lens group further shortens the matching lens barrel while a large wide-angle and a long depth of field are ensured, which makes the lens assembly more advantageous in thinness and lightness, thereby avoiding, to the greatest extent, the disadvantages of wide-angle lens assemblies that are generally too large. Accordingly, the lens assembly can better meet use requirements in various special scenarios.

In the exemplary implementations, the optical imaging lens assembly according to the present disclosure may satisfy: $5.0 < d3s/(R5+R6) < 10.5$. Here, d3s is an inner diameter of an object-side surface of the third spacing element, R5 is a radius of curvature of an object-side surface of the third lens, and R6 is a radius of curvature of the image-side surface of the third lens. More specifically, d3s, R5 and R6 may further satisfy: When $5.0 < d3s/(R5+R6) < 10.5$ is satisfied, by setting the inner diameter of the object-side surface of the third spacing element, light can be blocked, which can effectively reduce the probability of excess light entering the optical imaging lens assembly. At the same time, by reasonably controlling the radii of curvature of the fifth lens and the sixth lens, the distribution uniformity of light reaching the image plane can be effectively controlled, which effectively controls the dispersion of the MTF curve of the optical imaging lens assembly to improve the evaluation peak value, obtaining a good imaging capability. In addition, the reasonable radii of curvature can reduce a degree of bending of a lens, which reduces an internal stress during molding, thereby reducing a risk of fracturing during assembling and improving a yield of finished products.

In the exemplary implementations, the optical imaging lens assembly according to the present disclosure may satisfy: $-17.5 < (CT5+T45) \times EP45/(CP4 \times f4) < -5.0$. Here, f4 is an effective focal length of the fourth lens, CT5 is a center thickness of the fifth lens on the optical axis, T45 is an air spacing between the fourth lens and the fifth lens on the optical axis, CP4 is a maximal thickness of the fourth spacing element along the direction of the optical axis, and EP45 is a spacing between the fourth spacing element and the fifth spacing element along the direction of the optical axis. More specifically, CT5, T45, EP45, CP4 and f4 may further satisfy: $-17.19 < (CT5+T45) \times EP45/(CP4 \times f4) < -5.51$. When $-17.5 < (CT5+T45) \times EP45/(CP4 \times f4) < -5.0$ is satisfied, the stray light of a black object can be effectively avoided, and at the same time, the assembling stability can be improved, the air spacing can be stabilized, the sensitivity of the lens assembly can be reduced, and the reliability performance can be improved.

In the exemplary implementations, the optical imaging lens assembly according to the present disclosure may satisfy: $-7.5 < (R7+R8)/(D5m-d5m) < -1.0$. Here, R7 is a radius of curvature of an object-side surface of the fourth lens, R8 is a radius of curvature of the image-side surface of the fourth lens, D5m is an outer diameter of an image-side surface of the fifth spacing element, and d5m is an inner diameter of the image-side surface of the fifth spacing element. More specifically, R7, R8, D5m and d5m may further satisfy: $-7.43 < (R7+R8)/(D5m-d5m) < -1.04$. When $-7.5 < (R7+R8)/(D5m-d5m) < -1.0$ is satisfied, the degree of bending of the lens can be effectively reduced to reduce the risks of molding and appearance. At the same time, a large segment difference at this position during assembling can be avoided, and thus, the stability of the lens assembly can be greatly improved, thereby avoiding the disadvantage of a poor consistency of most wide-angle lens assemblies.

In the exemplary implementations, the optical imaging lens assembly according to the present disclosure may satisfy: $10.0 < (d5s+d6s)/(CT6+T56) < 13.5$. Here, d5s is an inner diameter of an object-side surface of the fifth spacing element, d6s is an inner diameter of an object-side surface of the sixth spacing element, CT6 is a center thickness of the sixth lens on the optical axis, and T56 is an air spacing between the fifth lens and the sixth lens on the optical axis. For d6s, reference may be made to FIG. 1A. More specifically, d5s, d6s, CT6 and T56 may further satisfy: $10.47 < (d5s+d6s)/(CT6+T56) < 13.11$. when $10.0 < (d5s+d6s)/(CT6+T56) < 13.5$ is satisfied, it is possible to effectively eliminate incident light with a poor edge quality and useless light generated by the internal reflection of the mechanism, and increase the distribution uniformity of light in all directions on the image plane, thereby obtaining better imaging distortion performance than existing wide-angle lens assemblies. At the same time, thickness-thinness ratio of the sixth lens will be controlled to be within a reasonable range, and thus, a risk in welding marks will be reduced, a smoothness of the lens will be improved, and a assembling tilt will be reduced, thereby improving the overall stability of the optical imaging lens assembly and improving the yield of mass production.

In the exemplary implementations, the optical imaging lens assembly according to the present disclosure may satisfy: $4.0<(d4s-EP45)/CT4<9.0$. Here, d4s is an inner diameter of an object-side surface of the fourth spacing element, EP45 is a spacing between the fourth spacing element and the fifth spacing element along the direction of the optical axis, and CT4 is a center thickness of the fourth lens on the optical axis. More specifically, d4s, EP45 and CT4 may further satisfy: $4.49<(d45-EP45)/CT4<8.89$. Satisfying $4.0<(d4s-EP45)/CT4<9.0$ enables an angle between the light passing through the fourth lens and the optical axis to become small, which makes the light more convergent, thereby improving the relative illumination. At the same time, the excess light can be absorbed by reasonably setting the parameter d4s, which reduces the ghosting and stray light caused by light leakage at an edge of the fourth lens. Meanwhile, by reasonably setting the center thickness of the fourth lens on the optical axis, it facilitates to improve the smoothness of the lens surface and reduce an influence of interference of a bearing surface during assembling, to improve a bearing compactness of the lenses, thereby improving the stability.

In the exemplary implementations, the optical imaging lens assembly according to the present disclosure may satisfy: $11.0<CT3/CP3-CT4/CP4<17.5$. Here, CT3 is a center thickness of the third lens on the optical axis, CT4 is the center thickness of the fourth lens on the optical axis, CP3 a maximal thickness of the third spacing element along the direction of the optical axis, and CP4 is the maximal thickness of the fourth spacing element along the direction of the optical axis. More specifically, CT3, CP3, CT4 and CP4 may further satisfy: $11.10<CT3/CP3-CT4/CP4<17.41$. The third lens and the fourth lens are located in the middle of the entire imaging lens group, where the sensitivity of the air spacing to the entire optical system is the highest. When $11.0<CT3/CP3-CT4/CP4<17.5$ is satisfied, by reasonably adjusting the parameter among the thicknesses of the third lens and the fourth lens and the thicknesses of the third spacing element and the fourth spacing element, the sensitivity of the air spacing between the third lens and the fourth lens to the system can be reduced to the greatest extent, such that the optical imaging lens assembly can still maintain a good performance under high temperature, high humidity and thermal shock conditions. Meanwhile, by controlling the center thicknesses of the third lens and the fourth lens, a relatively uniform lens thickness can be obtained, which is conducive to the molding of the lenses and reducing the AS of surface types, thereby obtaining a better imaging performance.

In the exemplary implementations, the optical imaging lens assembly according to the present disclosure may satisfy: $16.0<(D1s-d2s)\times f2-(D5m\times EP56)<33.0$. Here, D1s is an outer diameter of an object-side surface of the first spacing element, d2s is an inner diameter of an object-side surface of the second spacing element, f2 is an effective focal length of the second lens, D5m is the outer diameter of the image-side surface of the fifth spacing element, and EP56 is a spacing between the fifth spacing element and the sixth spacing element along the direction of the optical axis. More specifically, D1s, d2s, f2, D5m and EP56 may further satisfy: $16.19<(D1s-d2s)\times f2-(D5m\times EP56)<32.10$. When $16.0<(D1s-d2s)\times f2-(D5m\times EP56)<33.0$ is satisfied, by reasonably controlling the effective focal length of the second lens, it is conducive to improving the field-of-view of the lens assembly. At the same time, by setting the values of the outer diameter of the object-side surface of the first spacer and the inner diameter of the object-side surface of the second spacer, the stray light caused by internal reflection in the optical structure of the first lens can be effectively absorbed, such that the images obtained by the lens assembly are clear with no abnormalities. EP56 is an air spacing for the adjustment for the field curvature of the system. By reasonably setting a parameter range of EP56, a sensitivity of EP56 can be reduced. When a linear proportional change between the air spacing and the field curvature is obtained, the yield of the MTF performance curve can be adjusted more effectively in the actual production process.

In the exemplary implementations, the optical imaging lens assembly according to the present disclosure may satisfy: $110.0<(R1+R2)/CP1<135.0$. Here, CP1 is the maximal thickness of the first spacing element along the direction of the optical axis, R1 is a radius of curvature of an object-side surface of the first lens, and R2 is a radius of curvature of the image-side surface of the first lens. For CP1, reference may be made to FIG. 1A. More specifically, R1, R2 and CP1 may further satisfy: $117.35<(R1+R2)/CP1<134.84$. Satisfying $110.0<(R1+R2)/CP1<135.0$ helps to balance the aberration of the system, and at the same time, improves a degree of convergence of the first two lenses for the incoming light, thereby improving the field-of-view of the lens assembly and obtaining a better wide-angle performance. By controlling the thickness of the first spacing element, the stray light generated by and internal reflection of the mechanism at the first lens and the inner diameter surface of the first spacing element can be effectively eliminated, thereby suppressing the risk of stray light. When $110.0<(R1+R2)/CP1<135.0$ is satisfied by the first lens and the second lens, the supporting part of the mechanism can be designed more reasonably, to obtain an excellent assembling stability, thereby improving the process yield.

In the exemplary implementations, the optical imaging lens assembly according to the present disclosure may satisfy: $-230.0<f6/R11+R7/CP4<311.0$. Here, f6 is the effective focal length of the sixth lens, R7 is the radius of curvature of the object-side surface of the fourth lens, R11 is a radius of curvature of an object-side surface of the sixth lens, and CP4 is the maximal thickness of the fourth spacing element along the direction of the optical axis. More specifically, f6, R11, R7 and CP4 may further satisfy: $-224.08<f6/R11+R7/CP4<310.79$. When $-230.0<f6/R11+R7/CP4<311.0$ is satisfied, by reasonably controlling the radius of curvature of the object-side surface of the fourth lens and the radius of curvature of the object-side surface of the sixth lens, it is conducive to improving the chromatic aberration and distortion of the optical imaging lens assembly, thereby improving the imaging quality. The thickness of the fourth spacer is reasonably controlled to make the fourth space match the structure parts of the third lens and the fourth lens, which can better determine the position at which light is cut while ensuring the assembling stability. By reasonably controlling the focal length of the sixth lens, the focusing position of light can be adjusted to shorten the total length of the optical imaging lens assembly.

In the exemplary implementations, the optical imaging lens assembly according to the present disclosure may satisfy: $-4.0<D1s\times\tan(\text{Semi-FOV})/(\Sigma AT-L)<-2.0$. Here, D1s is the outer diameter of the object-side surface of the first spacing element, Semi-FOV is half of a maximal field-of-view of the optical imaging lens assembly, ΣAT is a sum of air spacings between any two adjacent lenses in the lenses from the first lens to the sixth lens on the optical axis, and L is a maximal height of the lens barrel along the direction of the optical axis. For D1s and L, reference may be made to FIG. 1A. More specifically, D1s, Semi-FOV, ΣAT and L may further satisfy: $-3.23<D1s\times\tan(\text{Semi-FOV})/(\Sigma AT-L)<-2.43$. When $-4.0<D1s\times\tan(\text{Semi-FOV})/(\Sigma AT-L)<-2.0$ is satisfied, by adjusting the air spacings between the lenses of the imaging lens group and the relationship between the field-of-view and the maximal height of the lens barrel, the lens assembly has a small axial height under the premise of ensuring the imaging capability, which makes the lens assembly have the characteristics of miniaturization and a light weight to meet the requirements of existing ultra-thin wide-angle mobile phones for lens assemblies. At the same time, the risk of the object-side surface of the first lens and the image-side surface of the sixth lens protruding outside is avoided, to prevent the risk of appearance of the lenses. The structure part of the first lens of a wide-angle lens assembly easily generates stray light. By reasonably controlling the outer diameter of the object-side surface of the first spacer to be within a certain range, the stray light is avoided when light enters from the structure part of the first lens to the structure part of the second lens.

In the exemplary implementations, the half of the maximal field-of-view Semi-FOV of the optical imaging lens assembly may be greater than 60°, and Semi-FOV may be, for example, in the range from 60.6° to 60.9°.

In the exemplary implementations, the effective focal length f1 of the first lens may be, for example, in a range from −3.31 mm to −3.28 mm. The effective focal length f4 of the fourth lens may be, for example, in a range from −3.32 mm to −3.15 mm. The effective focal length f5 of the fifth lens may be, for example, in a range from 3.20 mm to 3.40 mm. The effective focal length f6 of the sixth lens may be, for example, in a range from 233.85 mm to 770.31 mm.

In the exemplary implementations, the above optical imaging lens assembly may further include an optical filter for correcting color deviations and/or a protective glass for protecting a photosensitive element on the image plane. The present disclosure proposes an optical imaging lens assembly having the characteristics such as miniaturization, a large image plane, a large aperture and a high imaging quality. The optical imaging lens assembly according to the above implementations of the present disclosure may use a plurality of lenses, for example, the six lenses described above. By reasonably distributing the refractive powers, surface types and center thicknesses of the lenses, the axial spacing distances between the lenses, etc., the incident light can be effectively converged, the total track length of the imaging lens assembly can be reduced and the processability of the imaging lens assembly can be improved, which makes the production and processing for the optical imaging lens assembly more easy.

In the implementations of the present disclosure, at least one of the surfaces of the lenses is an aspheric surface, that is, at least one of the object-side surface of the first lens to the image-side surface of the sixth lens is an aspheric surface. An aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. Alternatively, at least one of the object-side surface and image-side surface of each of the first lens, the second lens, the third lens, the fourth lens, the fifth lens and the sixth lens is an aspheric surface. Alternatively, the object-side surface and the image-side surface of each of the first lens, the second lens, the third lens, the fourth lens, the fifth lens and the sixth lens are aspheric surfaces.

Specific embodiments of the optical imaging lens assembly that may be applicable to the above implementations are further described below with reference to the accompanying drawings.

Embodiment 1

Figure 2A:
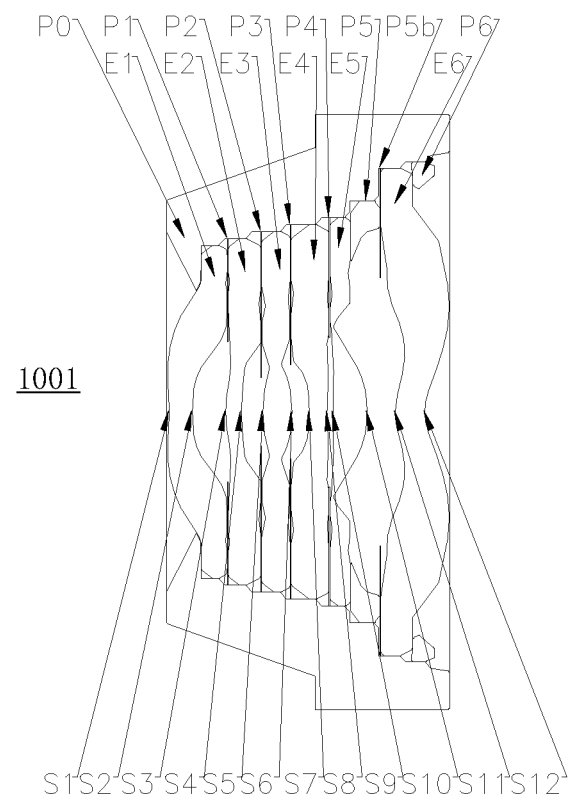
FIGS. 2A and 2B are schematic structural diagrams of an optical imaging lens assembly according to Embodiment 1 of the present disclosure.
Figure 2B:
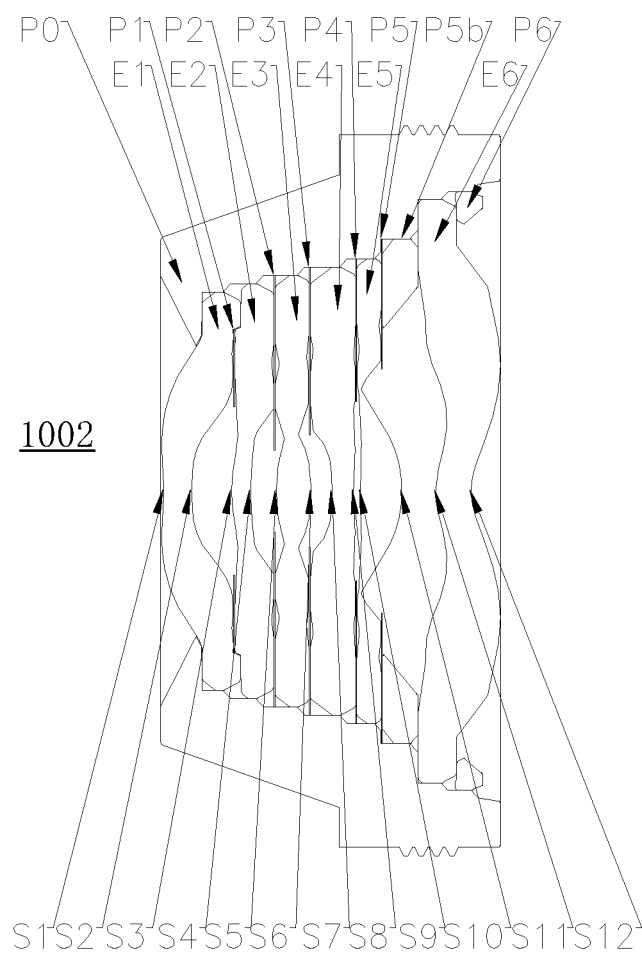

Optical imaging lens assemblies 1001 and 1002 according to Embodiment 1 of the present disclosure are described below with reference to FIGS. 2A-3D. FIGS. 2A and 2B are schematic structural diagrams of the optical imaging lens assemblies 1001 and 1002 according to Embodiment 1 of the present disclosure.

As shown in FIGS. 2A and 2B, the optical imaging lens assemblies 1001 and 1002 respectively include a lens barrel P0, an imaging lens group E1-E6 and a plurality of spacing elements P1-P6.

As shown in FIGS. 2A and 2B, the optical imaging lens assemblies 1001 and 1002 adopt an identical imaging lens group. The imaging lens group of each of the optical imaging lens assemblies 1001 and 1002 includes, sequentially from an object side to an image side, a first lens E1, a second lens E2, a third lens E3, a fourth lens E4, a fifth lens E5 and a sixth lens E6. Here, the first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a concave surface. Light from an object sequentially passes through the surfaces S1-S12, and finally forms an image on an image plane (not shown).

Table 1 is a table showing basic parameters of the imaging lens groups of the optical imaging lens assemblies 1001 and 1002 in Embodiment 1. Here, the units of a radius of curvature and a thickness/distance are millimeters (mm).

TABLE 1

| surface number | surface type | radius of curvature | thickness/ distance | material refractive index | material abbe number | conic coefficient |
|---|---|---|---|---|---|---|
| OBJ | spherical | infinite | 840.0000 | | | |
| S1 | aspheric | −2.8863 | 0.4500 | 1.55 | 56.1 | −0.2633 |
| S2 | aspheric | 4.9987 | 0.6573 | | | −0.6080 |
| S3 | aspheric | 2.0041 | 0.3095 | 1.62 | 25.9 | 0.0506 |
| S4 | aspheric | 3.4146 | 0.3652 | | | −0.1303 |
| STO | spherical | infinite | 0.0305 | | | |
| S5 | aspheric | 2.6782 | 0.5718 | 1.55 | 56.1 | −0.6962 |
| S6 | aspheric | −2.4064 | 0.3251 | | | 0.0546 |
| S7 | aspheric | −7.3794 | 0.2585 | 1.68 | 19.2 | 29.8048 |
| S8 | aspheric | 3.2568 | 0.1073 | | | −1.0346 |
| S9 | aspheric | 5.5390 | 0.8264 | 1.55 | 56.1 | −1.4416 |
| S10 | aspheric | −2.6097 | 0.4925 | | | 0.2983 |
| S11 | aspheric | 1.0329 | 0.5478 | 1.57 | 37.4 | −0.9955 |
| S12 | aspheric | 0.8406 | 0.5371 | | | −0.9893 |
| S13 | spherical | infinite | 0.2100 | 1.52 | 64.2 | |
| S14 | spherical | infinite | 0.3582 | | | |
| S15 | spherical | infinite | | | | |

In this example, an effective focal length f1 of the first lens is −3.29 mm, an effective focal length f2 of the second lens is 7.23 mm, an effective focal length f4 of the fourth lens is −3.31 mm, an effective focal length f5 of the fifth lens is 3.37 mm, an effective focal length f6 of the sixth lens is 233.86 mm, and half of a maximal field-of-view Semi-FOV of the optical imaging lens assembly is 60.8°.

In Embodiment 1, the object-side surfaces and the image-side surfaces of the first to sixth lenses E1-E6 are aspheric surfaces, and the surface type x of each aspheric lens may be defined using, but not limited to, the following formula:

$$x = \frac{ch^2}{1+\sqrt{1-(k+1)c^2h^2}} + \sum A_i h^i. \quad (1)$$

Here, X is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and $A_i$ is the correction coefficient of an i-th order of the aspheric surface. Tables 2-1 and 2-2 show the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1-S12 in Embodiment 1.

TABLE 2-1

| surface number | A4 | A6 | A8 | A10 | A12 | A14 | A16 |
|---|---|---|---|---|---|---|---|
| S1 | 1.4700E+00 | −2.4621E−01 | 6.7072E−02 | −2.3978E−02 | 8.8638E−03 | −3.4771E−03 | 1.3669E−03 |
| S2 | 5.9248E−01 | −1.7597E−01 | 3.3725E−03 | 6.2631E−03 | 5.1462E−03 | −2.1610E−03 | −1.0874E−03 |
| S3 | −2.4664E−01 | −7.5212E−03 | 1.2819E−02 | −1.4329E−03 | −1.8070E−03 | −1.4599E−04 | 2.2330E−04 |
| S4 | −3.0790E−02 | 6.0579E−03 | 5.4775E−03 | 1.1101E−03 | 2.0759E−04 | 1.3985E−05 | 9.9066E−06 |
| S5 | 1.2116E−02 | −3.4386E−04 | −1.3673E−04 | −6.4095E−05 | −8.3971E−05 | −7.9536E−05 | −6.8878E−05 |
| S6 | −5.2270E−02 | −1.2737E−04 | −7.7020E−07 | 2.0536E−04 | 1.0290E−04 | 3.7046E−05 | 1.5927E−05 |
| S7 | −2.3281E−01 | 4.4350E−03 | −1.7423E−03 | 1.3545E−03 | 6.3198E−04 | 3.6963E−04 | 2.9430E−05 |
| S8 | −3.0961E−01 | 7.3906E−02 | −1.0124E−02 | 5.6624E−03 | 1.8474E−04 | 9.6788E−04 | −2.7478E−04 |
| S9 | −1.9526E−01 | 3.6301E−02 | −1.0669E−02 | 2.3853E−03 | −2.1646E−03 | 4.6320E−04 | −3.7051E−04 |
| S10 | −1.6685E−01 | 1.1811E−01 | −2.2421E−02 | 4.6537E−03 | −8.4471E−04 | −4.9529E−04 | −3.2836E−04 |
| S11 | −4.2040E+00 | 1.0481E+00 | −2.5842E−01 | 6.4111E−02 | −3.6590E−02 | 2.0758E−02 | −6.2941E−03 |
| S12 | −5.7353E+00 | 1.1167E+00 | −3.2973E−01 | 1.4539E−01 | −5.9279E−02 | 2.3488E−02 | −1.4152E−02 |

TABLE 2-2

| surface number | A18 | A20 | A22 | A24 | A26 | A28 | A30 |
|---|---|---|---|---|---|---|---|
| S1 | −7.1348E−04 | 2.5041E−04 | −1.4117E−04 | 5.8856E−05 | −2.9057E−05 | 2.3227E−05 | −2.9063E−06 |
| S2 | 2.4035E−04 | 4.9365E−04 | −4.1098E−06 | −1.4047E−04 | −5.4493E−05 | 3.9063E−05 | 1.6957E−05 |
| S3 | 2.8778E−05 | 3.3929E−05 | 1.1165E−04 | 1.2477E−04 | 7.3486E−05 | 2.9477E−05 | 7.4294E−06 |
| S4 | −1.8767E−05 | −3.2186E−05 | −3.6329E−05 | −2.6347E−05 | −1.7528E−05 | −6.5161E−06 | −2.4467E−06 |
| S5 | −4.9182E−05 | −3.8193E−05 | −2.5539E−05 | −1.8005E−05 | −9.7962E−06 | −4.1765E−06 | 0.0000E+00 |
| S6 | 9.3466E−06 | 1.4517E−05 | 1.0943E−05 | 1.1261E−05 | 6.0367E−06 | 3.8777E−06 | 8.6677E−07 |
| S7 | 2.1555E−05 | −1.2339E−05 | 2.3707E−05 | 1.2111E−05 | 1.6050E−05 | 4.3018E−06 | 4.0507E−06 |
| S8 | 1.1304E−05 | −2.2350E−04 | −8.1986E−05 | −1.0808E−04 | −3.9165E−05 | −2.3229E−05 | 0.0000E+00 |
| S9 | 1.6473E−04 | −1.0475E−04 | 3.5704E−05 | −1.2210E−05 | 8.6889E−06 | −6.6096E−06 | −2.4883E−07 |
| S10 | 9.4286E−04 | 1.9312E−04 | 8.5293E−05 | −2.6579E−05 | 6.8533E−05 | 3.6496E−05 | 1.9984E−05 |
| S11 | 8.8119E−04 | −1.0251E−03 | 1.4901E−03 | −6.8594E−06 | −4.6287E−04 | 7.0413E−05 | 3.5682E−04 |
| S12 | 6.8706E−03 | −2.1949E−03 | 1.2256E−03 | −5.0322E−04 | 1.0129E−04 | −3.0018E−04 | 1.4037E−04 |

As shown in FIGS. 2A and 2B, the optical imaging lens assemblies 1001 and 1002 respectively include seven spacing elements, and the seven spacing elements are respectively a first spacing element P1, a second spacing element P2, a third spacing element P3, a fourth spacing element P4, a fifth spacing element P5, a fifth sub-spacing element P5b, and a sixth spacing element P6. Here, the first spacing element P1 is disposed between the first lens E1 and the second lens E2 and is in contact with the image-side surface of the first lens E1. The second spacing element P2 is disposed between the second lens E2 and the third lens E3 and is in contact with the image-side surface of the second lens E2. The third spacing element P3 is disposed between the third lens E3 and the fourth lens E4 and is in contact with the image-side surface of the third lens E3. The fourth spacing element P4 is disposed between the fourth lens E4 and the fifth lens E5 and is in contact with the image-side surface of the fourth lens E4. The fifth spacing element P5 and the fifth sub-spacing element P5b are disposed between the fifth lens E5 and the sixth lens E6, and the fifth spacing element P5 is in contact with the image-side surface of the fifth lens E5. The fifth sub-spacing element P5b may also be referred to as an auxiliary spacing element. The object-side surface of the fifth sub-spacing element P5b is in contact with the fifth spacing element P5 located on the object-side surface of the fifth sub-spacing element P5b, and the image-side surface of the fifth sub-spacing element P5b is in contact with the object-side surface of the sixth lens E6 located on the image side of the fifth sub-spacing element P5b. The sixth spacing element P6 is disposed on the image side of the sixth lens E6 and is in contact with the image-side surface of the sixth lens E6.

In this embodiment, the first spacing element P1, the second spacing element P2, the third spacing element P3, the fourth spacing element P4 and the fifth sub-spacing element P5b of the optical imaging lens assembly 1001 are spacers, the fifth spacing element P5 is a spacer ring, and the sixth spacing element P6 is a clamping ring. The first spacing element P1, the second spacing element P2, the third spacing element P3, the fourth spacing element P4 and the fifth spacing element P5 of the optical imaging lens assembly 1002 are spacers, the fifth sub-spacing element P5b is a spacer ring, and the sixth spacing element P6 is a clamping ring. The above seven spacing elements can block the entry of excess light from the outside, make the lenses to be better supported against the lens barrel, and enhance the structural stability of the optical imaging lens assemblies 1001 and 1002.

Table 3 shows basic parameters of the spacing elements and lens barrels of the optical imaging lens assemblies 1001 and 1002 in Embodiment 1. Exemplarily, a maximal height L of the lens barrel of each of the optical imaging lens assemblies 1001 and 1002 along a direction of the optical axis is 5.54 mm, and the difference between the optical imaging lens assemblies 1001 and 1002 lies in the structure sizes of the spacing elements.

TABLE 3

| parameters in embodiment | optical imaging lens assembly 1001 | optical imaging lens assembly 1002 |
| --- | --- | --- |
| d3s | 1.69 | 1.69 |
| EP45 | 0.4 | 0.4 |
| CP4 | 0.02 | 0.02 |
| D5m | 7.32 | 7.58 |
| d5m | 6.64 | 3.67 |
| d5s | 5.46 | 3.67 |

TABLE 3-continued

| parameters in embodiment | optical imaging lens assembly 1001 | optical imaging lens assembly 1002 |
| --- | --- | --- |
| d6s | 8.16 | 8.16 |
| d4s | 2.69 | 2.69 |
| CP3 | 0.02 | 0.02 |
| D1s | 6.24 | 4.86 |
| d2s | 1.24 | 1.24 |
| EP56 | 0.62 | 1.2 |
| CP1 | 0.02 | 0.02 |
| L | 5.54 | 5.54 |
| CP5 | 0.582 | 0.018 |
| CP6 | 0.452 | 0.452 |

Figure 3A:
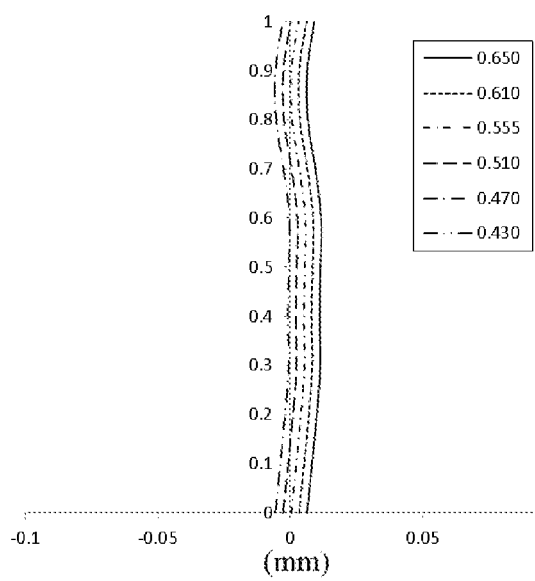
Figure 3B:
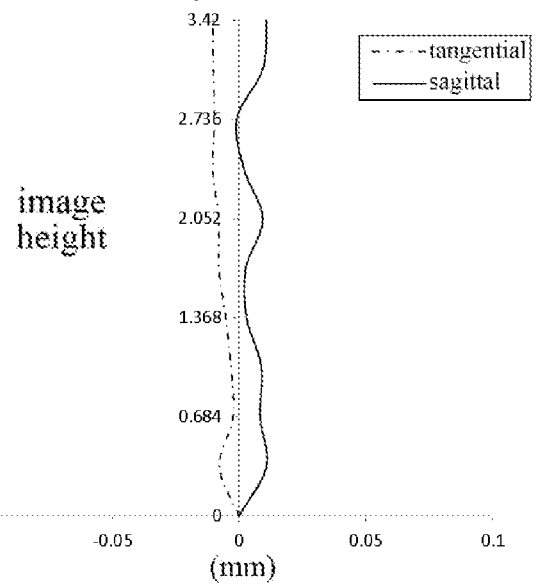

FIG. 3A illustrates longitudinal aberration curves of the optical imaging lens assemblies 1001 and 1002 according to Embodiment 1, representing deviations of focal points converged by light of different wavelengths which passes through the lens assembly. FIG. 3B illustrates astigmatic curves of the optical imaging lens assemblies 1001 and 1002 according to Embodiment 1, representing a curvature of a tangential image plane and a curvature of a sagittal image plane. FIG. 3C illustrates distortion curves of the optical imaging lens assemblies 1001 and 1002 according to Embodiment 1, representing amounts of distortion corresponding to different image heights. FIG. 3D illustrates lateral color curves of the optical imaging lens assemblies 1001 and 1002 according to Embodiment 1, representing deviations of different image heights on the image plane after light passes through the lens assemblies. It can be seen from FIGS. 3A-3D that the optical imaging lens assemblies 1001 and 1002 given in Embodiment 1 can achieve a good imaging quality.

Embodiment 2

Figure 4B:
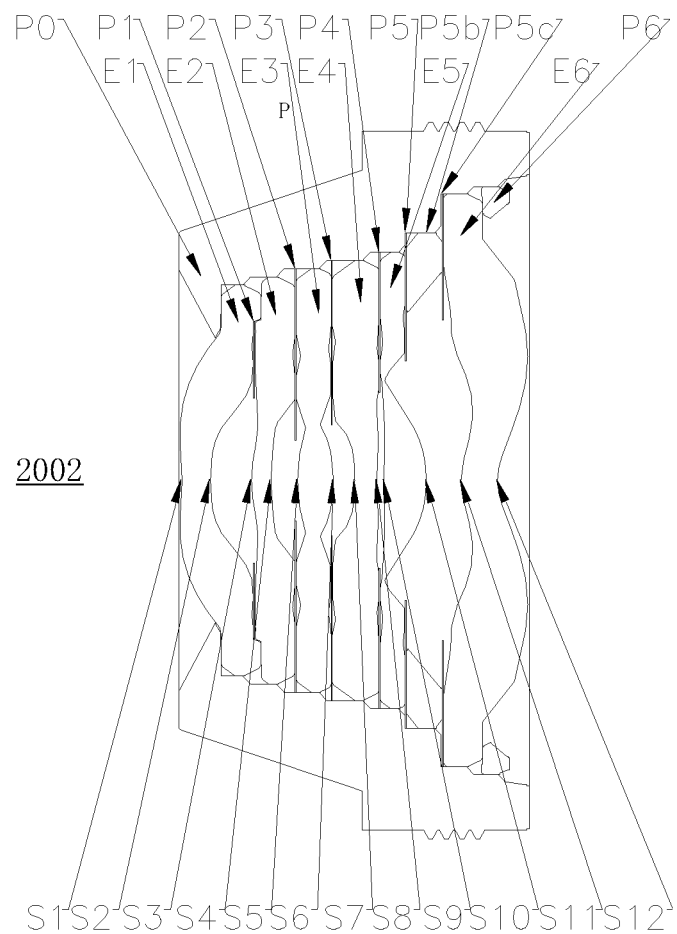

Optical imaging lens assemblies 2001 and 2002 according to Embodiment 2 of the present disclosure are described below with reference to FIGS. 4A-5D. In this embodiment and the following embodiment, for the sake of brevity, some descriptions similar to those in Embodiment 1 will be omitted. FIGS. 4A and 4B are schematic structural diagrams of the optical imaging lens assemblies 2001 and 2002 according to Embodiment 2 of the present disclosure.

As shown in FIGS. 4A and 4B, the optical imaging lens assemblies 2001 and 2002 respectively include a lens barrel P0, an imaging lens group E1-E6 and a plurality of spacing elements P1-P6.

As shown in FIGS. 4A and 4B, the optical imaging lens assemblies 2001 and 2002 adopt an identical imaging lens group. The imaging lens group of each of the optical imaging lens assemblies 2001 and 2002 includes, sequentially from an object side to an image side, a first lens E1, a second lens E2, a third lens E3, a fourth lens E4, a fifth lens E5 and a sixth lens E6. Here, the first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a concave surface. Light from an object sequentially passes through the surfaces S1-S12, and finally forms an image on an image plane (not shown).

In this example, an effective focal length f1 of the first lens is −3.29 mm, an effective focal length f2 of the second lens is 7.36 mm, an effective focal length f4 of the fourth lens is −3.16 mm, an effective focal length f5 of the fifth lens is 3.21 mm, an effective focal length f6 of the sixth lens is 770.30 mm, and half of a maximal field-of-view Semi-FOV of the optical imaging lens assembly is 60.8°.

Table 4 is a table showing basic parameters of the imaging lens groups of the optical imaging lens assemblies 2001 and 2002 in Embodiment 2. Here, the units of a radius of curvature and a thickness/distance are millimeters (mm).

Tables 5-1 and 5-2 show the high-order coefficients applicable to the aspheric surfaces in Embodiment 2. Here, the surface type of each aspheric surface may be defined using the formula (1) given in Embodiment 1.

TABLE 4

| surface number | surface type | radius of curvature | thickness/ distance | refractive index | abbe number | conic coefficient |
|---|---|---|---|---|---|---|
| OBJ | spherical | infinite | 840.0000 | | | |
| S1 | aspheric | −2.8114 | 0.4500 | 1.55 | 56.1 | −0.3986 |
| S2 | aspheric | 5.2383 | 0.6517 | | | −1.1216 |
| S3 | aspheric | 2.0272 | 0.3083 | 1.62 | 25.9 | 0.0274 |
| S4 | aspheric | 3.4423 | 0.3911 | | | −1.1045 |
| STO | spherical | infinite | 0.0300 | | | |
| S5 | aspheric | 2.5851 | 0.5713 | 1.55 | 56.1 | −0.9330 |
| S6 | aspheric | −2.4193 | 0.3367 | | | 0.3040 |
| S7 | aspheric | −7.5139 | 0.3500 | 1.68 | 19.2 | 35.7991 |
| S8 | aspheric | 3.0421 | 0.1139 | | | −1.7903 |
| S9 | aspheric | 5.5581 | 0.6700 | 1.55 | 56.1 | −4.6955 |
| S10 | aspheric | −2.4523 | 0.5521 | | | 0.4660 |
| S11 | aspheric | 1.0578 | 0.5765 | 1.57 | 37.4 | −0.9934 |
| S12 | aspheric | 0.8506 | 0.5429 | | | −0.9876 |
| S13 | spherical | infinite | 0.2100 | 1.52 | 64.2 | |
| S14 | spherical | infinite | 0.2485 | | | |
| S15 | spherical | infinite | | | | |

TABLE 5-1

| surface number | A4 | A6 | A8 | A10 | A12 | A14 | A16 |
|---|---|---|---|---|---|---|---|
| S1 | 1.4916E+00 | −2.4173E−01 | 6.8209E−02 | −2.4312E−02 | 8.9449E−03 | −3.4448E−03 | 1.3872E−03 |
| S2 | 5.9046E−01 | −1.7282E−01 | 3.2107E−03 | 6.0150E−03 | 5.4812E−03 | −2.0450E−03 | −1.2795E−03 |
| S3 | −2.4803E−01 | −4.6505E−03 | 1.2197E−02 | −1.3958E−03 | −1.6811E−03 | −2.5656E−04 | 1.3733E−04 |
| S4 | −3.2663E−02 | 6.4306E−03 | 5.2612E−03 | 1.2078E−03 | 3.6095E−04 | 1.3825E−04 | 8.8667E−05 |
| S5 | 1.1511E−02 | −6.5869E−04 | −2.5743E−04 | −1.0452E−04 | −8.3034E−05 | −6.5712E−05 | −4.9257E−05 |
| S6 | −5.3591E−02 | 1.1036E−04 | −2.4739E−04 | 7.5424E−05 | 8.8991E−05 | 5.3171E−05 | 5.5745E−05 |
| S7 | −2.3742E−01 | 4.7466E−03 | −3.5407E−04 | 9.7223E−04 | 4.5921E−04 | 2.9963E−04 | 4.0490E−05 |
| S8 | −3.1584E−01 | 7.3372E−02 | −7.3379E−03 | 3.8788E−03 | 5.9296E−05 | 1.1515E−03 | 2.4008E−05 |
| S9 | −2.0046E−01 | 3.8515E−02 | −8.8159E−03 | 4.1350E−03 | −2.1323E−03 | 6.1030E−04 | −4.1750E−04 |
| S10 | −1.7886E−01 | 1.1543E−01 | −2.6861E−02 | 3.0294E−03 | −9.8064E−03 | −9.4842E−04 | 7.4536E−04 |
| S11 | −4.0053E+00 | 9.7640E−01 | −2.3711E−01 | 5.7391E−02 | −3.3506E−02 | 1.7745E−02 | −4.4722E−03 |
| S12 | −5.7110E+00 | 1.1392E+00 | −3.3885E−01 | 1.4288E−01 | −6.1563E−02 | 2.3772E−02 | −1.3890E−02 |

TABLE 5-2

| surface number | A18 | A20 | A22 | A24 | A26 | A28 | A30 |
|---|---|---|---|---|---|---|---|
| S1 | −6.3960E−04 | 2.5606E−04 | −1.2617E−04 | 3.8782E−05 | −2.9164E−05 | 1.6947E−05 | −1.4894E−06 |
| S2 | 1.7931E−04 | 4.8264E−04 | 2.3195E−05 | −1.3016E−04 | −4.7848E−05 | 3.0329E−05 | 7.5584E−06 |
| S3 | 3.3926E−05 | 4.6190E−05 | 9.8333E−05 | 1.0516E−04 | 6.5949E−05 | 3.1181E−05 | 8.4079E−06 |
| S4 | 4.8446E−05 | 2.2306E−05 | 8.0251E−06 | 7.1758E−07 | −1.9996E−06 | −6.0778E−07 | −6.3923E−07 |
| S5 | −3.4258E−05 | −2.8294E−05 | −2.1391E−05 | −1.5249E−05 | −7.5312E−06 | −2.7293E−06 | 0.0000E+00 |
| S6 | 4.5061E−05 | 4.9455E−05 | 3.6125E−05 | 2.9202E−05 | 1.4660E−05 | 7.3447E−06 | 6.9320E−07 |
| S7 | 4.6778E−05 | 1.8890E−05 | 4.9108E−05 | 2.5657E−05 | 2.4529E−05 | 7.4733E−06 | 4.5662E−06 |
| S8 | 2.7689E−04 | −9.6344E−06 | 8.1140E−05 | −2.3897E−05 | 4.0812E−06 | −1.7541E−05 | 0.0000E+00 |
| S9 | 2.7331E−04 | −1.2226E−04 | 4.3565E−05 | −2.6300E−05 | 2.0212E−05 | −6.6387E−06 | 6.2973E−07 |
| S10 | 1.9621E−03 | 4.0603E−04 | −1.6002E−04 | −2.2195E−04 | 8.8554E−06 | 2.4048E−05 | 6.6831E−06 |
| S11 | −7.4985E−05 | −6.4272E−04 | 1.7544E−03 | 3.4137E−04 | −5.8475E−04 | −2.3873E−04 | 1.7823E−04 |
| S12 | 6.9448E−03 | −1.8826E−03 | 1.2457E−03 | −5.3789E−04 | 1.2072E−04 | −3.1105E−04 | 1.3139E−04 |

As shown in FIG. 4A, the optical imaging lens assembly 2001 includes seven spacing elements, and the seven spacing elements are respectively a first spacing element P1, a second spacing element P2, a third spacing element P3, a fourth spacing element P4, a fifth spacing element P5, a fifth sub-spacing element P5b, and a sixth spacing element P6. Here, the first spacing element P1 is disposed between the first lens E1 and the second lens E2 and is in contact with the image-side surface of the first lens E1. The second spacing element P2 is disposed between the second lens E2 and the third lens E3 and is in contact with the image-side surface of the second lens E2. The third spacing element P3 is disposed between the third lens E3 and the fourth lens E4 and is in contact with the image-side surface of the third lens E3. The fourth spacing element P4 is disposed between the fourth lens E4 and the fifth lens E5 and is in contact with the image-side surface of the fourth lens E4. The fifth spacing element P5 and the fifth sub-spacing element P5b are disposed between the fifth lens E5 and the sixth lens E6, and the fifth spacing element P5 is in contact with the image-side surface of the fifth lens E5. The fifth sub-spacing element P5b may also be referred to as an auxiliary spacing element. The object-side surface of the fifth sub-spacing element P5b is in contact with the fifth spacing element P5 located on the object side of the fifth sub-spacing element P5b, and the image-side surface of the fifth sub-spacing element P5b is in contact with the object-side surface of the sixth lens E6 located on the image side of the fifth sub-spacing element P5b. The sixth spacing element P6 is disposed on the image side of the sixth lens E6 and is in contact with the image-side surface of the sixth lens E6. In this embodiment, the first spacing element P1, the second spacing element P2, the third spacing element P3, the fourth spacing element P4 and the fifth sub-spacing element P5b of the optical imaging lens assembly 2001 are spacers, the fifth spacing element P5 is a spacer ring, and the sixth spacing element P6 is a clamping ring. The above seven spacing elements can block the entry of excess light from the outside, make the lenses better supported against the lens barrel, and enhance the structural stability of the optical imaging lens assembly 2001.

As shown in FIG. 4B, the optical imaging lens assembly 2002 includes eight spacing elements, and the eight spacing elements are respectively a first spacing element P1, a second spacing element P2, a third spacing element P3, a fourth spacing element P4, a fifth spacing element P5, a fifth sub-spacing element P5b, a fifth sub-sub-spacing element P5c, and a sixth spacing element P6. Here, the first spacing element P1 is disposed between the first lens E1 and the second lens E2 and is in contact with the image-side surface of the first lens E1. The second spacing element P2 is disposed between the second lens E2 and the third lens E3 and is in contact with the image-side surface of the second lens E2. The third spacing element P3 is disposed between the third lens E3 and the fourth lens E4 and is in contact with the image-side surface of the third lens E3. The fourth spacing element P4 is disposed between the fourth lens E4 and the fifth lens E5 and is in contact with the image-side surface of the fourth lens E4. The fifth spacing element P5, the fifth sub-spacing element P5b and the fifth sub-sub-spacing element P5c are disposed between the fifth lens E5 and the sixth lens E6, and the fifth spacing element P5 is in contact with the image-side surface of the fifth lens E5. The fifth sub-spacing element P5b and the fifth sub-sub-spacing element P5c may both be referred to as an auxiliary spacing element. The object-side surface of the fifth sub-spacing element P5b is in contact with the fifth spacing element P5 located on the object side of the fifth sub-spacing element P5b, and the image-side surface of the fifth sub-sub-spacing element P5c is in contact with the object-side surface of the sixth lens E6 located on the image side of the fifth sub-sub-spacing element P5c. The fifth sub-spacing element P5b is disposed between the fifth spacing element P5 and the fifth sub-sub-spacing element P5c, and the image-side surface of the fifth sub-spacing element P5b is in contact with the object-side surface of the fifth sub-sub-spacing element P5c. The sixth spacing element P6 is disposed on the image side of the sixth lens E6 and is in contact with the image-side surface of the sixth lens E6. In this embodiment, the first spacing element P1, the second spacing element P2, the third spacing element P3, the fourth spacing element P4, the fifth spacing element P5 and the fifth sub-sub-spacing element P5c of the optical imaging lens assembly 2002 are spacers, the fifth sub-spacing element P5b is a spacer ring, and the sixth spacing element P6 is a clamping ring. The above eight spacing elements can block the entry of excess light from the outside, make the lenses better supported against the lens barrel, and enhance the structural stability of the optical imaging lens assembly 2002.

Table 6 shows basic parameters of the spacing elements and lens barrels of the optical imaging lens assemblies 2001 and 2002 in Embodiment 2. Exemplarily, a maximal height L of the lens barrel of each of the optical imaging lens assemblies 2001 and 2002 along a direction of the optical axis is 5.54 mm, and the difference between the optical imaging lens assemblies 2001 and 2002 lies in the structure sizes of the spacing elements.

TABLE 6

| parameters in embodiment | optical imaging lens assembly 2001 | optical imaging lens assembly 2002 |
|---|---|---|
| d3s | 1.72 | 1.69 |
| EP45 | 0.40 | 0.40 |
| CP4 | 0.02 | 0.02 |
| D5m | 7.32 | 7.58 |
| d5m | 6.64 | 3.67 |
| d5s | 5.46 | 3.67 |
| d6s | 8.16 | 8.16 |
| d4s | 2.72 | 2.69 |
| CP3 | 0.02 | 0.02 |
| D1s | 6.24 | 4.86 |
| d2s | 1.24 | 1.24 |
| EP56 | 0.64 | 1.20 |
| CP1 | 0.02 | 0.02 |
| L | 5.54 | 5.54 |
| CP5 | 0.582 | 0.018 |
| CP6 | 0.452 | 0.452 |

Figure 5A:
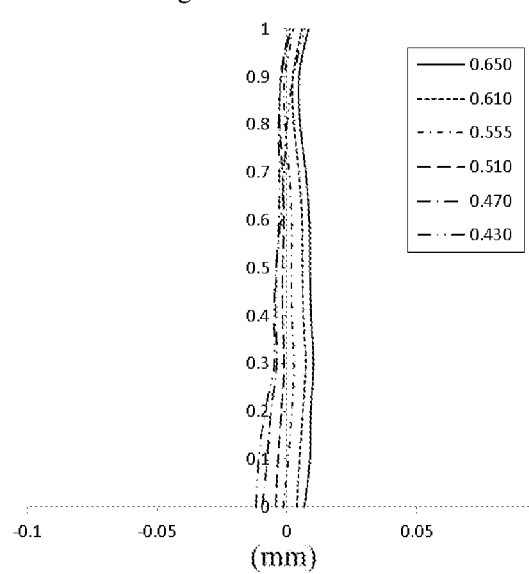
FIGS. 5A-5D respectively illustrate a longitudinal aberration curve, an astigmatic curve, a distortion curve and a lateral color curve of the optical imaging lens assembly according to Embodiment 2 of the present disclosure.
Figure 5B:
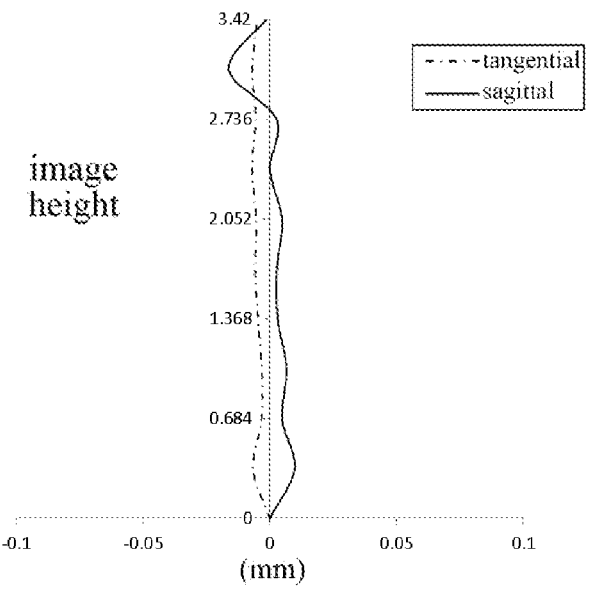
Figure 5C:
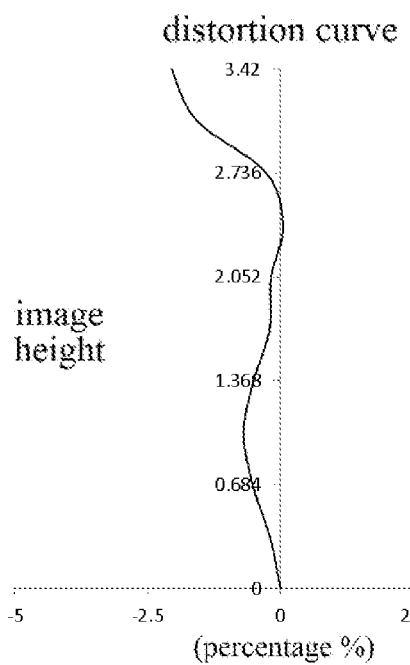
Figure 5D:
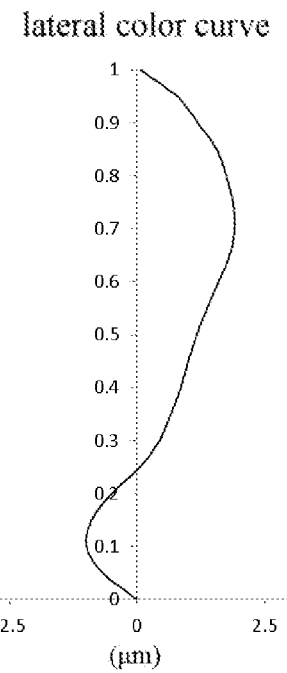

FIG. 5A illustrates longitudinal aberration curves of the optical imaging lens assemblies 2001 and 2002 according to Embodiment 2, representing deviations of focal points converged by light of different wavelengths which passes through the lens assembly. FIG. 5B illustrates astigmatic curves of the optical imaging lens assemblies 2001 and 2002 according to Embodiment 2, representing a curvature of a tangential image plane and a curvature of a sagittal image plane. FIG. 5C illustrates distortion curves of the optical imaging lens assemblies 2001 and 2002 according to Embodiment 2, representing amounts of distortion corresponding to different image heights. FIG. 5D illustrates lateral color curves of the optical imaging lens assemblies 2001 and 2002 according to Embodiment 2, representing deviations of different image heights on the image plane after light passes through the lens assemblies. It can be seen from FIGS. 5A-5D that the optical imaging lens assemblies 2001 and 2002 given in Embodiment 2 can achieve a good imaging quality.

Embodiment 3

Figure 6A:
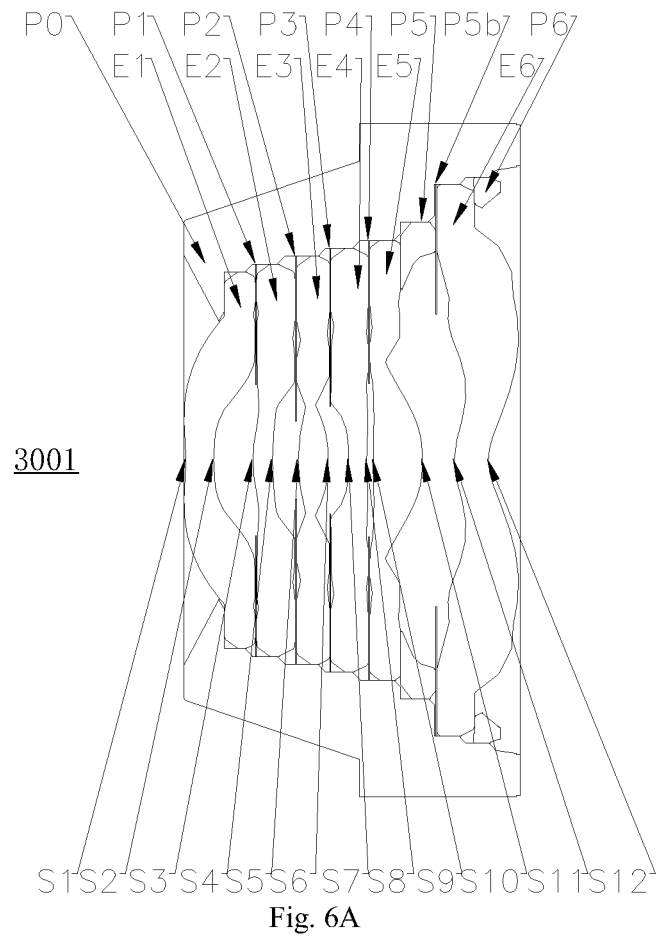
FIGS. 6A and 6B are schematic structural diagrams of an optical imaging lens assembly according to Embodiment 3 of the present disclosure.
Figure 6B:
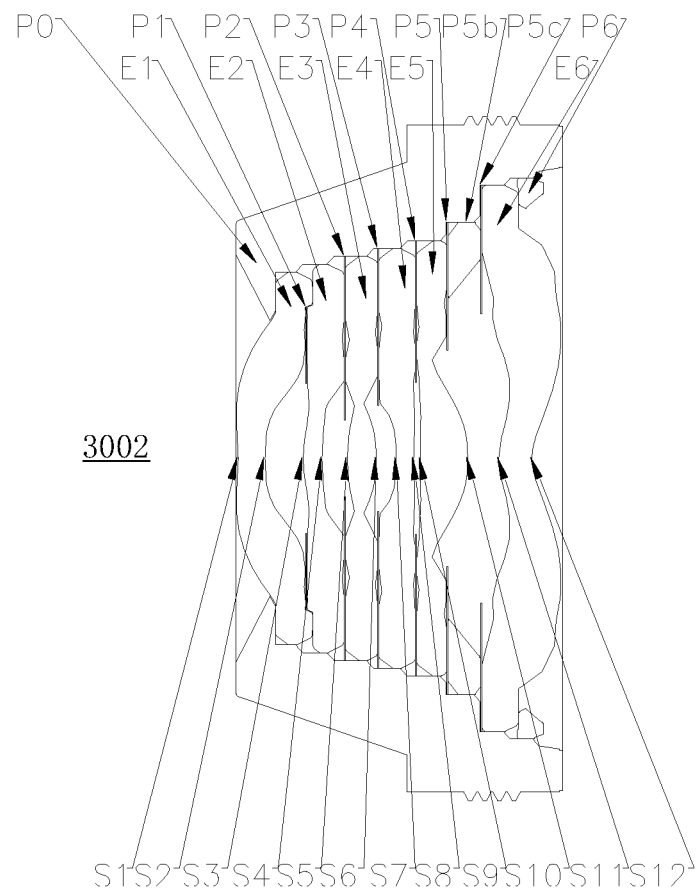

Optical imaging lens assemblies 3001 and 3002 according to Embodiment 3 of the present disclosure are described below with reference to FIGS. 6A-7D. FIGS. 6A and 6B are schematic structural diagrams of the optical imaging lens assemblies 3001 and 3002 according to Embodiment 3 of the present disclosure.

As shown in FIGS. 6A and 6B, the optical imaging lens assemblies 3001 and 3002 respectively include a lens barrel P0, an imaging lens group E1-E6 and a plurality of spacing elements P1-P6.

As shown in FIGS. 6A and 6B, the optical imaging lens assemblies 3001 and 3002 adopt an identical imaging lens group. The imaging lens group of each of the optical imaging lens assemblies 3001 and 3002 includes, sequentially from an object side to an image side, a first lens E1, a second lens E2, a third lens E3, a fourth lens E4, a fifth lens E5 and a sixth lens E6. Here, the first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a concave surface. Light from an object sequentially passes through the surfaces S1-S12, and finally forms an image on an image plane (not shown).

In this example, an effective focal length f1 of the first lens is −3.30 mm, an effective focal length f2 of the second lens is 6.98 mm, an effective focal length f4 of the fourth lens is −3.28 mm, an effective focal length f5 of the fifth lens is 3.39 mm, an effective focal length f6 of the sixth lens is 237.14 mm, and half of a maximal field-of-view Semi-FOV of the optical imaging lens assembly is 60.7°.

Table 7 is a table showing basic parameters of the imaging lens groups of the optical imaging lens assemblies 3001 and 3002 in Embodiment 3. Here, the units of a radius of curvature and a thickness/distance are millimeters (mm). Tables 8-1 and 8-2 show the high-order coefficients applicable to the aspheric surfaces in Embodiment 3. Here, the surface type of each aspheric surface may be defined using the formula (1) given in Embodiment 1.

TABLE 7

| surface number | surface type | radius of curvature | thickness/ distance | material refractive index | abbe number | conic coefficient |
|---|---|---|---|---|---|---|
| OBJ | spherical | infinite | 840.0000 | | | |
| S1 | aspheric | −2.8275 | 0.4563 | 1.55 | 56.1 | −0.3681 |
| S2 | aspheric | 5.2502 | 0.6532 | | | −1.0517 |
| S3 | aspheric | 2.0312 | 0.3215 | 1.62 | 25.9 | −0.0226 |
| S4 | aspheric | 3.5996 | 0.3887 | | | −1.2177 |
| STO | spherical | infinite | 0.0404 | | | |
| S5 | aspheric | 2.6973 | 0.5000 | 1.55 | 56.1 | −1.0196 |
| S6 | aspheric | −2.3678 | 0.3367 | | | 0.0920 |
| S7 | aspheric | −8.1478 | 0.3000 | 1.68 | 19.2 | 30.6484 |
| S8 | aspheric | 3.1011 | 0.1108 | | | −1.7527 |
| S9 | aspheric | 5.9296 | 0.8131 | 1.55 | 56.1 | −0.1289 |
| S10 | aspheric | −2.5646 | 0.5269 | | | 0.2453 |
| S11 | aspheric | 1.0374 | 0.5672 | 1.57 | 37.4 | −0.9927 |
| S12 | aspheric | 0.8379 | 0.5626 | | | −0.9863 |
| S13 | spherical | infinite | 0.2100 | 1.52 | 64.2 | |
| S14 | spherical | infinite | 0.2359 | | | |
| S15 | spherical | infinite | | | | |

TABLE 8-1

| surface number | A4 | A6 | A8 | A10 | A12 | A14 | A16 |
|---|---|---|---|---|---|---|---|
| S1 | 1.4863E+00 | −2.4293E−01 | 6.8180E−02 | −2.4195E−02 | 8.9773E−03 | −3.4419E−03 | 1.3895E−03 |
| S2 | 5.9071E−01 | −1.7348E−01 | 3.1180E−03 | 6.1725E−03 | 5.4472E−03 | −2.0863E−03 | −1.2825E−03 |
| S3 | −2.4958E−01 | −5.6838E−03 | 1.2791E−02 | −1.1658E−03 | −1.6527E−03 | −2.7124E−04 | 1.0619E−04 |
| S4 | −3.2914E−02 | 6.5147E−03 | 5.4531E−03 | 1.2699E−03 | 4.1410E−04 | 1.3933E−04 | 8.9708E−05 |
| S5 | 1.1283E−02 | −6.7046E−04 | −2.9348E−04 | −1.2370E−04 | −9.9754E−05 | −5.6259E−05 | −2.5252E−05 |
| S6 | −5.2348E−02 | −1.9963E−04 | −2.2396E−04 | 5.9307E−05 | 9.5751E−06 | −1.4385E−05 | 1.8470E−05 |
| S7 | −2.3506E−01 | 5.0551E−03 | −6.4051E−04 | 1.2749E−03 | 4.6966E−04 | 2.1758E−04 | −4.4686E−05 |
| S8 | −3.1529E−01 | 7.3127E−02 | −8.7292E−03 | 5.0397E−03 | 1.2155E−04 | 1.0157E−03 | −1.6504E−04 |
| S9 | −1.9479E−01 | 3.7768E−02 | −1.0519E−02 | 2.7671E−03 | −2.3605E−03 | 5.3873E−04 | −3.9784E−04 |
| S10 | −1.6334E−01 | 1.2208E−01 | −2.3404E−02 | 4.6276E−03 | −8.3086E−03 | −6.5941E−04 | −1.1884E−04 |
| S11 | −4.1892E+00 | 1.0482E+00 | −2.6420E−01 | 6.6109E−02 | −3.5664E−02 | 2.1004E−02 | −5.4973E−03 |
| S12 | −5.6890E+00 | 1.1376E+00 | −3.3482E−01 | 1.4422E−01 | −6.0316E−02 | 2.3842E−02 | −1.4077E−02 |

TABLE 8-2

| surface number | A18 | A20 | A22 | A24 | A26 | A28 | A30 |
|---|---|---|---|---|---|---|---|
| S1 | −6.5686E−04 | 2.4840E−04 | −1.3222E−04 | 4.3258E−05 | −2.8587E−05 | 1.8901E−05 | −1.7556E−06 |
| S2 | 2.0098E−05 | 5.0223E−04 | 3.6984E−05 | −1.3322E−04 | −5.2915E−05 | 2.9493E−05 | 1.1636E−05 |
| S3 | −4.5596E−05 | −3.9189E−05 | 2.6249E−05 | 6.6825E−05 | 5.4110E−05 | 3.1833E−05 | 1.0792E−05 |
| S4 | 3.6086E−05 | 1.9513E−05 | −1.5927E−07 | −4.9914E−06 | −8.8266E−06 | −3.3752E−06 | −2.4089E−06 |
| S5 | −4.5138E−06 | −2.2289E−06 | −5.7857E−08 | −8.3801E−07 | 8.2493E−08 | −8.1266E−07 | 0.0000E+00 |
| S6 | 3.6387E−05 | 4.7605E−05 | 3.3798E−05 | 2.2501E−05 | 6.3269E−06 | 1.1050E−06 | −2.5258E−06 |
| S7 | 2.5285E−06 | 3.0049E−06 | 4.0439E−05 | 2.0772E−05 | 2.0933E−05 | 6.5020E−06 | 5.5195E−06 |
| S8 | 1.2100E−04 | −1.2197E−04 | −2.9374E−0 5 | −8.1115E−05 | −2.9790E−05 | −1.8948E−05 | 0.0000E+00 |
| S9 | 1.6266E−04 | −1.2670E−04 | 3.8445E−05 | −1.0732E−05 | 1.1040E−05 | −7.1790E−06 | 6.2636E−07 |
| S10 | 1.1244E−03 | 3.1649E−04 | 1.3379E−04 | 3.7134E−05 | 9.6997E−05 | 4.3140E−05 | 7.6758E−06 |
| S11 | 3.7256E−04 | −6.3796E−04 | 1.6784E−03 | −5.5444E−05 | −7.4021E−04 | −1.0006E−04 | 2.3875E−04 |
| S12 | 6.8752E−03 | −1.9295E−03 | 1.2293E−03 | −5.3968E−04 | 1.2195E−04 | −3.0558E−04 | 1.3613E−04 |

As shown in FIG. 6A, the optical imaging lens assembly 3001 includes seven spacing elements, and the seven spacing elements are respectively a first spacing element P1, a second spacing element P2, a third spacing element P3, a fourth spacing element P4, a fifth spacing element P5, a fifth sub-spacing element P5b, and a sixth spacing element P6. Here, the first spacing element P1 is disposed between the first lens E1 and the second lens E2 and is in contact with the image-side surface of the first lens E1. The second spacing element P2 is disposed between the second lens E2 and the third lens E3 and is in contact with the image-side surface of the second lens E2. The third spacing element P3 is disposed between the third lens E3 and the fourth lens E4 and is in contact with the image-side surface of the third lens E3. The fourth spacing element P4 is disposed between the fourth lens E4 and the fifth lens E5 and is in contact with the image-side surface of the fourth lens E4. The fifth spacing element P5 and the fifth sub-spacing element P5b are disposed between the fifth lens E5 and the sixth lens E6, and the fifth spacing element P5 is in contact with the image-side surface of the fifth lens E5. The fifth sub-spacing element P5b may also be referred to as an auxiliary spacing element. The object-side surface of the fifth sub-spacing element P5b is in contact with the fifth spacing element P5 located on the object side of the fifth sub-spacing element P5b, and the image-side surface of the fifth sub-spacing element P5b is in contact with the object-side surface of the sixth lens E6 located on the image side of the fifth sub-spacing element P5b. The sixth spacing element P6 is disposed on the image side of the sixth lens E6 and is in contact with the image-side surface of the sixth lens E6. In this embodiment, the first spacing element P1, the second spacing element P2, the third spacing element P3, the fourth spacing element P4 and the fifth sub-spacing element P5b of the optical imaging lens assembly 3001 are spacers, the fifth spacing element P5 is a spacer ring, and the sixth spacing element P6 is a clamping ring. The above seven spacing elements can block the entry of excess light from the outside, make the lenses better supported against the lens barrel, and enhance the structural stability of the optical imaging lens assembly 3001.

As shown in FIG. 6B, the optical imaging lens assembly 3002 includes eight spacing elements, and the eight spacing elements are respectively a first spacing element P1, a second spacing element P2, a third spacing element P3, a fourth spacing element P4, a fifth spacing element P5, a fifth sub-spacing element P5b, a fifth sub-sub-spacing element P5c, and a sixth spacing element P6. Here, the first spacing element P1 is disposed between the first lens E1 and the second lens E2 and is in contact with the image-side surface of the first lens E1. The second spacing element P2 is disposed between the second lens E2 and the third lens E3 and is in contact with the image-side surface of the second lens E2. The third spacing element P3 is disposed between the third lens E3 and the fourth lens E4 and is in contact with the image-side surface of the third lens E3. The fourth spacing element P4 is disposed between the fourth lens E4 and the fifth lens E5 and is in contact with the image-side surface of the fourth lens E4. The fifth spacing element P5, the fifth sub-spacing element P5b and the fifth sub-sub-spacing element P5c are disposed between the fifth lens E5 and the sixth lens E6, and the fifth spacing element P5 is in contact with the image-side surface of the fifth lens E5. The fifth sub-spacing element P5b and the fifth sub-sub-spacing element P5c may both be referred to as an auxiliary spacing element. The object-side surface of the fifth sub-spacing element P5b is in contact with the fifth spacing element P5 located on the object side of the fifth sub-spacing element P5b, and the image-side surface of the fifth sub-sub-spacing element P5c is in contact with the object-side surface of the sixth lens E6 located on the image side of the fifth sub-sub-spacing element P5c. The fifth sub-spacing element P5b is disposed between the fifth spacing element P5 and the fifth sub-sub-spacing element P5c, and the image-side surface of the fifth sub-spacing element P5b is in contact with the object-side surface of the fifth sub-sub-spacing element P5c. The sixth spacing element P6 is disposed on the image side of the sixth lens E6 and is in contact with the image-side surface of the sixth lens E6. In this embodiment, the first spacing element P1, the second spacing element P2, the third spacing element P3, the fourth spacing element P4, the fifth spacing element P5 and the fifth sub-sub-spacing element P5c of the optical imaging lens assembly 3002 are spacers, the fifth sub-spacing element P5b is a spacer ring, and the sixth spacing element P6 is a clamping ring. The above eight spacing elements can block the entry of excess light from the outside, make the lenses better supported against the lens barrel, and enhance the structural stability of the optical imaging lens assembly 3002.

Table 9 shows basic parameters of the spacing elements and lens barrels of the optical imaging lens assemblies 3001 and 3002 in Embodiment 3. Exemplarily, a maximal height L of the lens barrel of each of the optical imaging lens assemblies 3001 and 3002 along a direction of the optical axis are 5.58 mm, and the difference between the optical imaging lens assemblies 3001 and 3002 lies in the structure sizes of the spacing elements.

TABLE 9

| parameters in embodiment | optical imaging lens assembly 3001 | optical imaging lens assembly 3002 |
|---|---|---|
| d3s | 1.72 | 1.71 |
| EP45 | 1.10 | 0.52 |

TABLE 9-continued

| parameters in embodiment | optical imaging lens assembly 3001 | optical imaging lens assembly 3002 |
|---|---|---|
| CP4 | 0.02 | 0.02 |
| D5m | 7.32 | 7.58 |
| d5m | 6.64 | 3.47 |
| d5s | 5.46 | 3.47 |
| d6s | 8.16 | 8.16 |
| d4s | 2.45 | 2.44 |
| CP3 | 0.02 | 0.02 |
| D1s | 6.24 | 4.86 |
| d2s | 1.24 | 1.24 |
| EP56 | 0.64 | 1.20 |
| CP1 | 0.02 | 0.02 |
| L | 5.58 | 5.58 |
| CP5 | 0.582 | 0.018 |
| CP6 | 0.452 | 0.452 |

Figure 7A:
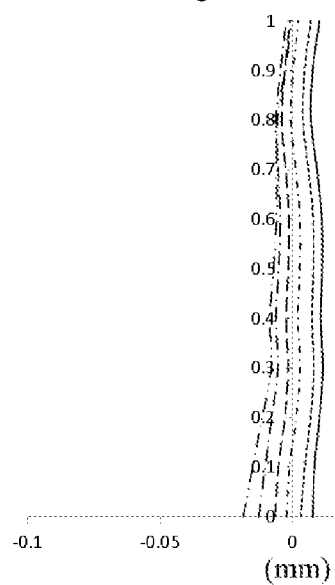
FIGS. 7A-7D illustrate a longitudinal aberration curve, an astigmatic curve, a distortion curve and a lateral color curve of the optical imaging lens assembly according to Embodiment 3 of the present disclosure.
Figure 7B:
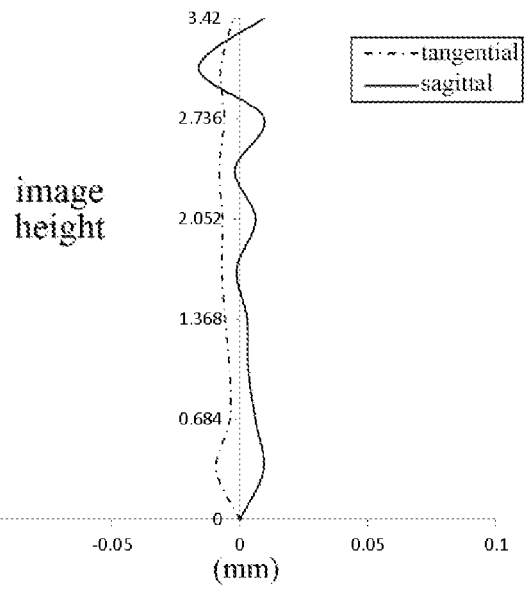
Figures 7C, 7D:
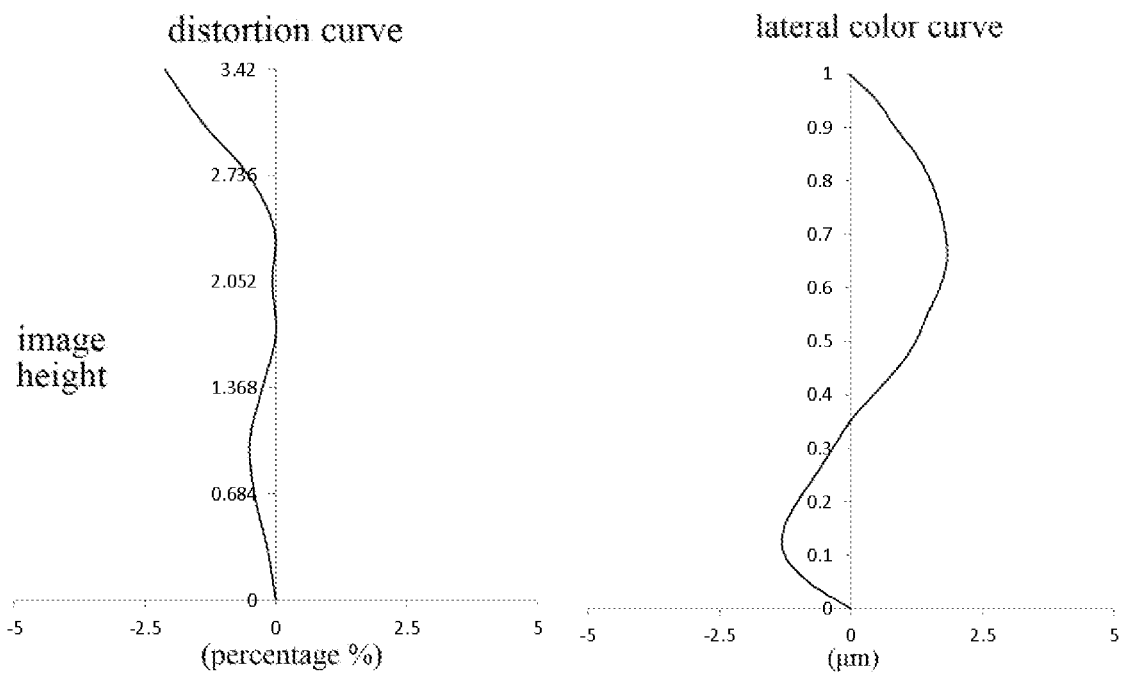

FIG. 7A illustrates longitudinal aberration curves of the optical imaging lens assemblies 3001 and 3002 according to Embodiment 3, representing deviations of focal points converged by light of different wavelengths which passes through the lens assembly. FIG. 7B illustrates astigmatic curves of the optical imaging lens assemblies 3001 and 3002 according to Embodiment 3, representing a curvature of a tangential image plane and a curvature of a sagittal image plane. FIG. 7C illustrates distortion curves of the optical imaging lens assemblies 3001 and 3002 according to Embodiment 3, representing amounts of distortion corresponding to different image heights. FIG. 7D illustrates lateral color curves of the optical imaging lens assemblies 3001 and 3002 according to Embodiment 3, representing deviations of different image heights on the image plane after light passes through the lens assemblies. It can be seen from FIGS. 7A-7D that the optical imaging lens assemblies 3001 and 3002 given in Embodiment 3 can achieve a good imaging quality.

In summary, the optical imaging lens assemblies 1001, 1002, 2001, 2002, 3001 and 3002 in Embodiments 1-3 satisfy the relationships shown in Table 10.

TABLE 10

| conditional expression | optical imaging lens assembly | | | | | |
|---|---|---|---|---|---|---|
| | 1001 | 1002 | 2001 | 2002 | 3001 | 3002 |
| d3s/(R5 + R6) | 6.24 | 6.24 | 10.35 | 10.22 | 5.22 | 5.19 |
| (CT5 + T45) × EP45/(CP4 × f4) | −6.28 | −6.28 | −5.52 | −5.52 | −17.18 | −8.09 |
| \|f6 × CP1/(CP5 × f5 + f1 × CP6)\| | 8.86 | 2.95 | 36.26 | 9.70 | 8.85 | 2.98 |
| (R7 + R8)/(D5m − d5m) | −6.06 | −1.05 | −6.58 | −1.14 | −7.42 | −1.23 |
| (d5s + d6s)/(CT6 + T56) | 13.10 | 11.37 | 12.07 | 10.48 | 12.46 | 10.64 |
| (d4s − EP45)/CT4 | 8.88 | 8.88 | 6.63 | 6.56 | 4.50 | 6.42 |
| CT3/CP3 − CT4/CP4 | 17.40 | 17.40 | 12.29 | 12.29 | 11.11 | 11.11 |
| (D1s − d2s) × f2 − (D5m × EP56) | 31.63 | 17.10 | 32.09 | 17.54 | 30.24 | 16.20 |
| (R1 + R2)/CP1 | 117.36 | 117.36 | 134.83 | 134.83 | 134.60 | 134.60 |
| f6/R11 + R7/CP4 | −183.56 | −183.56 | 310.78 | 310.78 | −224.07 | −224.07 |
| D1s × tan(Semi-FOV)/(ΣAT − L) | −3.13 | −2.44 | −3.22 | −2.51 | −3.16 | −2.46 |

The present disclosure further provides an imaging apparatus, of which the electronic photosensitive element may be a photosensitive charge-coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description for the preferred embodiments of the present disclosure and the applied technical principles. It should be appreciated by those skilled in the art that the scope of the present disclosure is not limited to the technical solution formed by the particular combination of the above technical features. The scope should also cover other technical solutions formed by any combination of the above technical features or equivalent features thereof without departing from the concept of the present disclosure, for example, technical solutions formed by replacing the features disclosed in the present disclosure with (but not limited to) technical features with similar functions.

What is claimed is:

1. An optical imaging lens assembly, comprising:
an imaging lens group, comprising, sequentially along an optical axis from an object side to an image side: a first lens having a negative refractive power, a second lens having a positive refractive power, a third lens having a positive refractive power, a fourth lens having a negative refractive power, a fifth lens having a positive refractive power and a sixth lens having a positive refractive power,
a plurality of spacing elements, comprising: a third spacing element that is placed between the third lens and the fourth lens and is in contact with an image-side surface of the third lens,
wherein an inner diameter d3s of an object-side surface of the third spacing element, a radius of curvature R5 of an object-side surface of the third lens and a radius of curvature R6 of the image-side surface of the third lens satisfy: 5.0<d3s/(R5+R6)<10.5.

2. The optical imaging lens assembly according to claim 1, wherein the plurality of spacing elements further comprise: a fourth spacing element that is placed between the fourth lens and the fifth lens and is in contact with an image-side surface of the fourth lens,
wherein an effective focal length f4 of the fourth lens, a center thickness CT5 of the fifth lens on the optical axis, an air spacing T45 between the fourth lens and the fifth lens on the optical axis, a maximal thickness CP4 of the fourth spacing element along the direction of the optical axis and a spacing EP45 between the fourth spacing element and the fifth spacing element along the direction of the optical axis satisfy:−17.5<(CT5+T45)× EP45/(CP4×f4)<−5.0, wherein the fifth spacing element is placed between the fifth lens and the sixth lens and is in contact with an image-side surface of the fifth lens.

3. The optical imaging lens assembly according to claim 1, wherein a radius of curvature R7 of an object-side surface of the fourth lens, a radius of curvature R8 of the image-side surface of the fourth lens, the outer diameter D5$m$ of the image-side surface of the fifth spacing element and an inner diameter d5$m$ of the image-side surface of the fifth spacing element satisfy: $-7.5 < (R7+R8)/(D5m-d5m) < -1.0$, wherein the fifth spacing element is placed between the fifth lens and the sixth lens and is in contact with an image-side surface of the fifth lens.

4. The optical imaging lens assembly according to claim 1, wherein an inner diameter d5$s$ of an object-side surface of the fifth spacing element, an inner diameter d6$s$ of an object-side surface of the sixth spacing element, a center thickness CT6 of the sixth lens on the optical axis and an air spacing T56 between the fifth lens and the sixth lens on the optical axis satisfy: $10.0 < (d5s+d6s)/(CT6+T56) < 13.5$, wherein the fifth spacing element is placed between the fifth lens and the sixth lens and is in contact with an image-side surface of the fifth lens, and the sixth spacing element is disposed on an image side of the sixth lens and is in contact with the image-side surface of the sixth lens.

5. The optical imaging lens assembly according to claim 1, wherein the plurality of spacing elements further comprise: a fourth spacing element that is placed between the fourth lens and the fifth lens and is in contact with an image-side surface of the fourth lens,
wherein an inner diameter d4$s$ of an object-side surface of the fourth spacing element, a spacing EP45 between the fourth spacing element a the fifth spacing element along the direction of the optical axis and a center thickness CT4 of the fourth lens on the optical axis satisfy: $4.0 < (d4s-EP45)/CT4 < 9.0$, wherein the fifth spacing element is placed between the fifth lens and the sixth lens and is in contact with an image-side surface of the fifth lens.

6. The optical imaging lens assembly according to claim 1, wherein the plurality of spacing elements further comprise: a fourth spacing element that is placed between the fourth lens and the fifth lens and is in contact with an image-side surface of the fourth lens,
wherein a center thickness CT3 of the third lens on the optical axis, a center thickness CT4 of the fourth lens on the optical axis, a maximal thickness CP3 of the third spacing element along the direction of the optical axis and a maximal thickness CP4 of the fourth spacing element along the direction of the optical axis satisfy: $11.0 < CT3/CP3 - CT4/CP4 < 17.5$.

7. The optical imaging lens assembly according to claim 1, wherein the plurality of spacing elements further comprise: a first spacing element that is placed between the first lens and the second lens and is in contact with an image-side surface of the first lens, and an effective focal length f1 of the first lens, an effective focal length f5 of the fifth lens, an effective focal length f6 of the sixth lens, a maximal thickness CP1 of the first spacing element along the direction of the optical axis, a maximal thickness CP5 of a fifth spacing element along the direction of the optical axis and a maximal thickness CP6 of the sixth spacing element along the direction of the optical axis satisfy: $|f6 \times CP1/(CP5 \times f5 + f1 \times CP6)| < 37.0$, wherein the fifth spacing element is placed between the fifth lens and the sixth lens and is in contact with an image-side surface of the fifth lens, and the sixth spacing element is disposed on an image side of the sixth lens and is in contact with the image-side surface of the sixth lens.

8. The optical imaging lens assembly according to claim 1, wherein the plurality of spacing elements further comprise: a first spacing element that is placed between the first lens and the second lens and is in contact with an image-side surface of the first lens, and a maximal thickness CP1 of the first spacing element along the direction of the optical axis, a radius of curvature R1 of an object-side surface of the first lens and a radius of curvature R2 of an image-side surface of the first lens satisfy: $110.0 < (R1+R2)/CP1 < 135.0$.

9. The optical imaging lens assembly according to claim 1, wherein the plurality of spacing elements further comprise: a fourth spacing element that is placed between the fourth lens and the fifth lens and is in contact with the image-side surface of the fourth lens,
wherein an effective focal length f6 of the sixth lens, a radius of curvature R7 of an object-side surface of the fourth lens, a radius of curvature R11 of an object-side surface of the sixth lens and a maximal thickness CP4 of the fourth spacing element along the direction of the optical axis satisfy: $-230.0 < f6/R11+R7/CP4 < 311.0$.

10. The optical imaging lens assembly according to claim 1, wherein the plurality of spacing elements further comprise at least one auxiliary spacing element placed between any two adjacent lenses, an object-side surface of the auxiliary spacing element is in contact with a spacing element located on an object side of the auxiliary spacing element or with an other auxiliary spacing element, and an image-side surface of the auxiliary spacing element is in contact with a lens located on an image side of the auxiliary spacing element or with an other auxiliary spacing element.

11. The optical imaging lens assembly according to claim 2, wherein a radius of curvature R7 of an object-side surface of the fourth lens, a radius of curvature R8 of the image-side surface of the fourth lens, the outer diameter D5$m$ of the image-side surface of the fifth spacing element and an inner diameter d5$m$ of the image-side surface of the fifth spacing element satisfy: $-7.5 < (R7+R8)/(D5m-d5m) < -1.0$.

12. The optical imaging lens assembly according to claim 2, wherein an inner diameter d5$s$ of an object-side surface of the fifth spacing element, an inner diameter d6$s$ of an object-side surface of a sixth spacing element, a center thickness CT6 of the sixth lens on the optical axis and an air spacing T56 between the fifth lens and the sixth lens on the optical axis satisfy: $10.0 < (d5s+d6s)/(CT6+T56) < 13.5$, wherein the sixth spacing element is disposed on an image side of the sixth lens and is in contact with the image-side surface of the sixth lens.

13. The optical imaging lens assembly according to claim 5, wherein the plurality of spacing elements further comprise: a first spacing element that is placed between the first lens and the second lens and is in contact with an image-side surface of the first lens, and a maximal thickness CP1 of the first spacing element along the direction of the optical axis, a radius of curvature R1 of an object-side surface of the first lens and a radius of curvature R2 of an image-side surface of the first lens satisfy: $110.0 < (R1+R2)/CP1 < 135.0$.

14. The optical imaging lens assembly according to claim 7, wherein the maximal thickness CP1 of the first spacing element along the direction of the optical axis, a radius of curvature R1 of an object-side surface of the first lens and a radius of curvature R2 of an image-side surface of the first lens satisfy: $110.0 < (R1+R2)/CP1 < 135.0$.

15. The optical imaging lens assembly according to claim 5, wherein the plurality of spacing elements further comprise: a first spacing element that is placed between the first lens and the second lens and is in contact with an image-side surface of the first lens, and the fourth spacing element that is placed between the fourth lens and the fifth lens and is in contact with the image-side surface of the fourth lens,
wherein an effective focal length f6 of the sixth lens, a radius of curvature R7 of an object-side surface of the fourth lens, a radius of curvature R11 of an object-side surface of the sixth lens and a maximal thickness CP4 of the fourth spacing element along the direction of the optical axis satisfy: −230.0<f6/R11+R7/CP4<311.0.

16. The optical imaging lens assembly according to claim 7, wherein the plurality of spacing elements further comprise: a fourth spacing element that is placed between the fourth lens and the fifth lens and is in contact with the image-side surface of the fourth lens,
  wherein the effective focal length f6 of the sixth lens, a radius of curvature R7 of an object-side surface of the fourth lens, a radius of curvature R11 of an object-side surface of the sixth lens and a maximal thickness CP4 of the fourth spacing element along the direction of the optical axis satisfy: −230.0<f6/R11+R7/CP4<311.0.

* * * * *